United States Patent [19]

Proia

[11] Patent Number: 5,479,999
[45] Date of Patent: Jan. 2, 1996

[54] POWERED, AUTOMATIC, SELF-TRACKING SYSTEM FOR THE REAR AXLES OF TRUCKS, TRAILERS AND BUSES

[76] Inventor: Cataldo Proia, 127 W. Embargo St., Rome, N.Y. 13440

[21] Appl. No.: 308,434

[22] Filed: Sep. 19, 1994

[51] Int. Cl.⁶ ....................................................... B62D 5/26
[52] U.S. Cl. ........................ 180/24.01; 180/140; 180/153; 280/98; 280/426
[58] Field of Search .................................... 180/24.01, 23, 180/140, 144, 150, 152, 153, 154; 280/97, 98, 100, 426, 442, 718, 713, 694, 81.5, 81.6

[56] References Cited

U.S. PATENT DOCUMENTS

| | | | |
|---|---|---|---|
| 2,284,245 | 5/1942 | Ayers | 280/98 |
| 2,359,299 | 10/1944 | Brown | 180/24.01 |
| 2,560,501 | 7/1951 | Webster, Jr. et al. | 180/24.01 |
| 3,051,506 | 8/1962 | Stump et al. | 280/81.6 |
| 3,831,962 | 8/1974 | Cator et al. | 180/24.01 |
| 4,286,798 | 9/1981 | Butler et al. | 180/23 |
| 5,201,836 | 4/1993 | DeWitt | 280/426 |
| 5,246,242 | 9/1993 | Penzotti | 280/426 |
| 5,320,192 | 6/1994 | Hayashida et al. | 180/140 |

FOREIGN PATENT DOCUMENTS

| | | | |
|---|---|---|---|
| 0484668 | 5/1992 | European Pat. Off. | 280/442 |
| 0080166 | 4/1987 | Japan | 180/24.01 |
| 0080170 | 4/1987 | Japan | 180/24.01 |
| 0080162 | 4/1987 | Japan | 180/24.01 |
| 0077364 | 3/1990 | Japan | 280/98 |
| 3193516 | 8/1991 | Japan | 280/718 |

*Primary Examiner*—Margaret A. Focarino
*Assistant Examiner*—Peter C. English
*Attorney, Agent, or Firm*—Katherine McGuire

[57] ABSTRACT

An automatic powered, self-tracking system for the rear axles of large vehicles which experience difficulty in cornering manueverability. A motion sensing device is placed in proximity to a steering component of the vehicle and is operable to sense and distinguish between right and left-hand turns in both forward and reverse travel. The motion sensor connects to a plurality of axle-pivoting mechanisms which are positioned to exert a force on preselected components of the vehicle's suspension system. The force exerted by the mechanisms is directly proportional to the degree of the turn, so that the associated axle is caused to pivot by an amount which directs it in an arcing path through the turn without skidding or cutting a curb or other obstacle short.

32 Claims, 20 Drawing Sheets

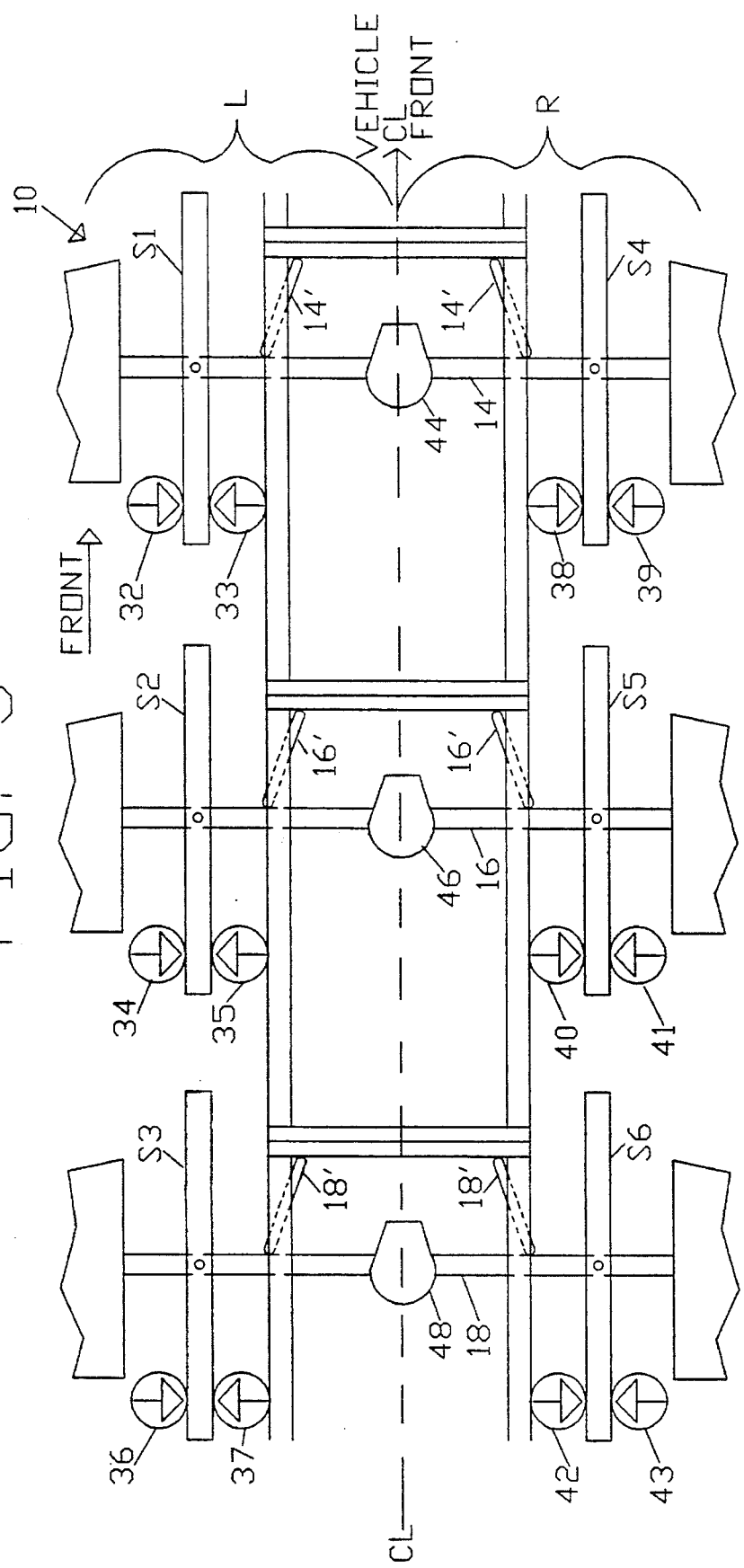

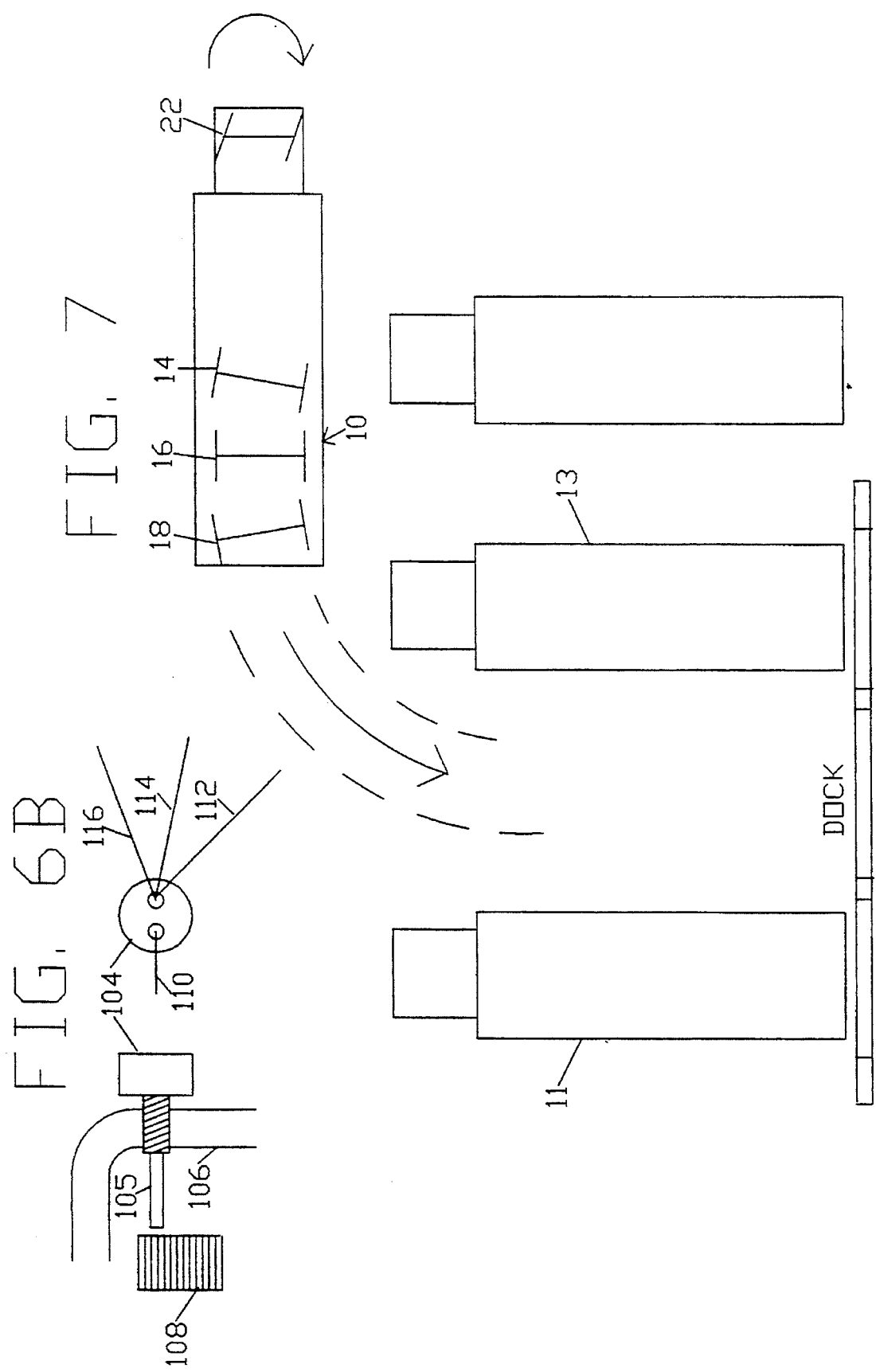

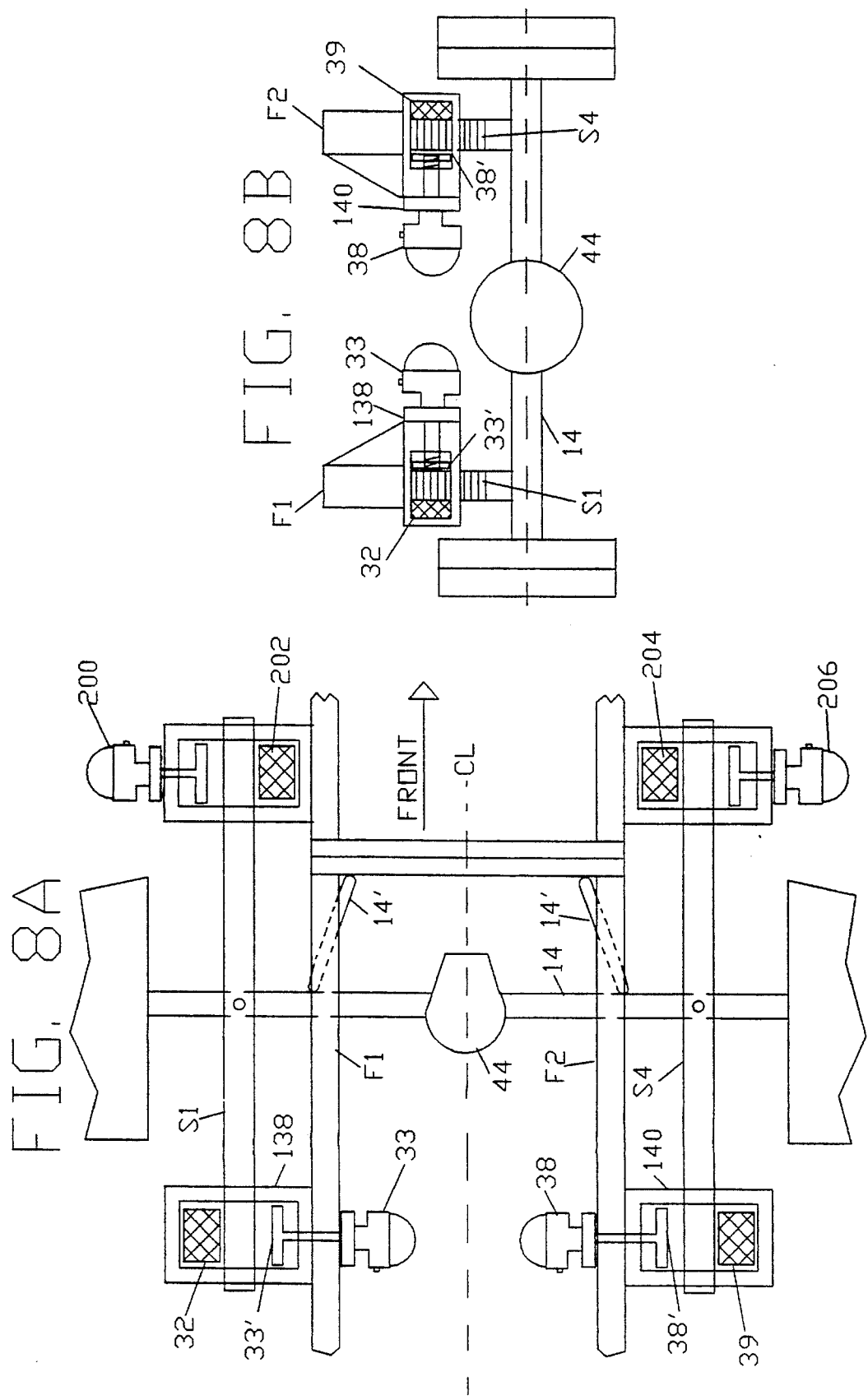

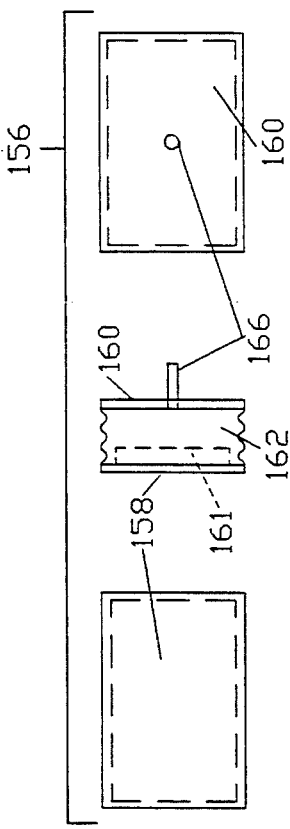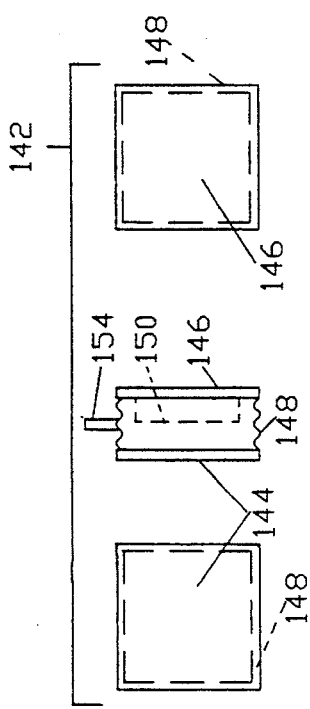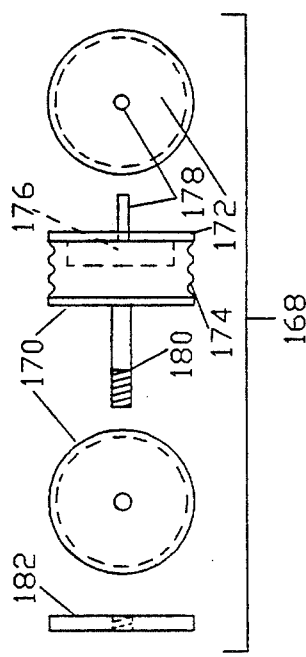

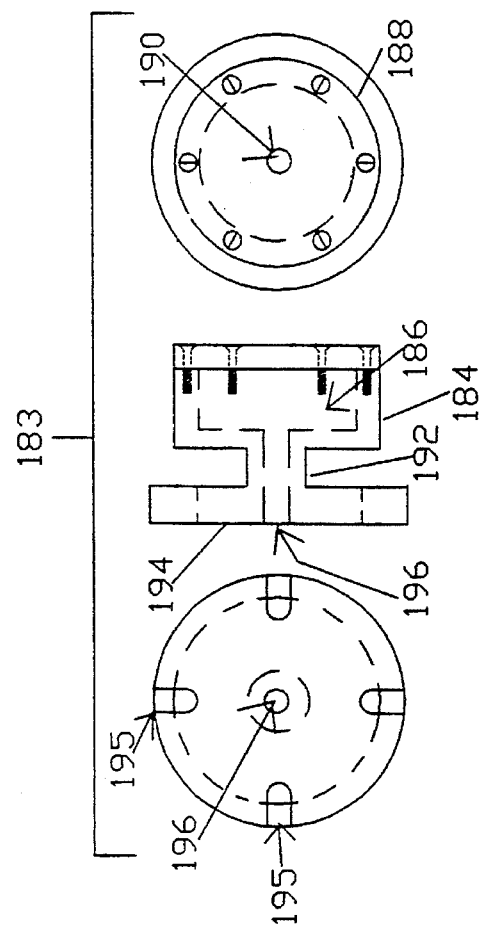
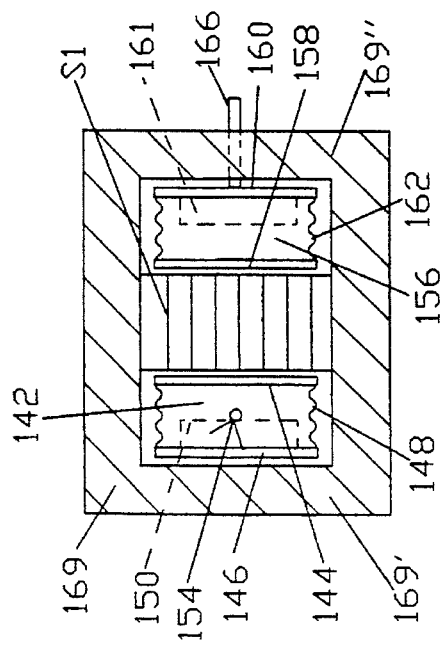

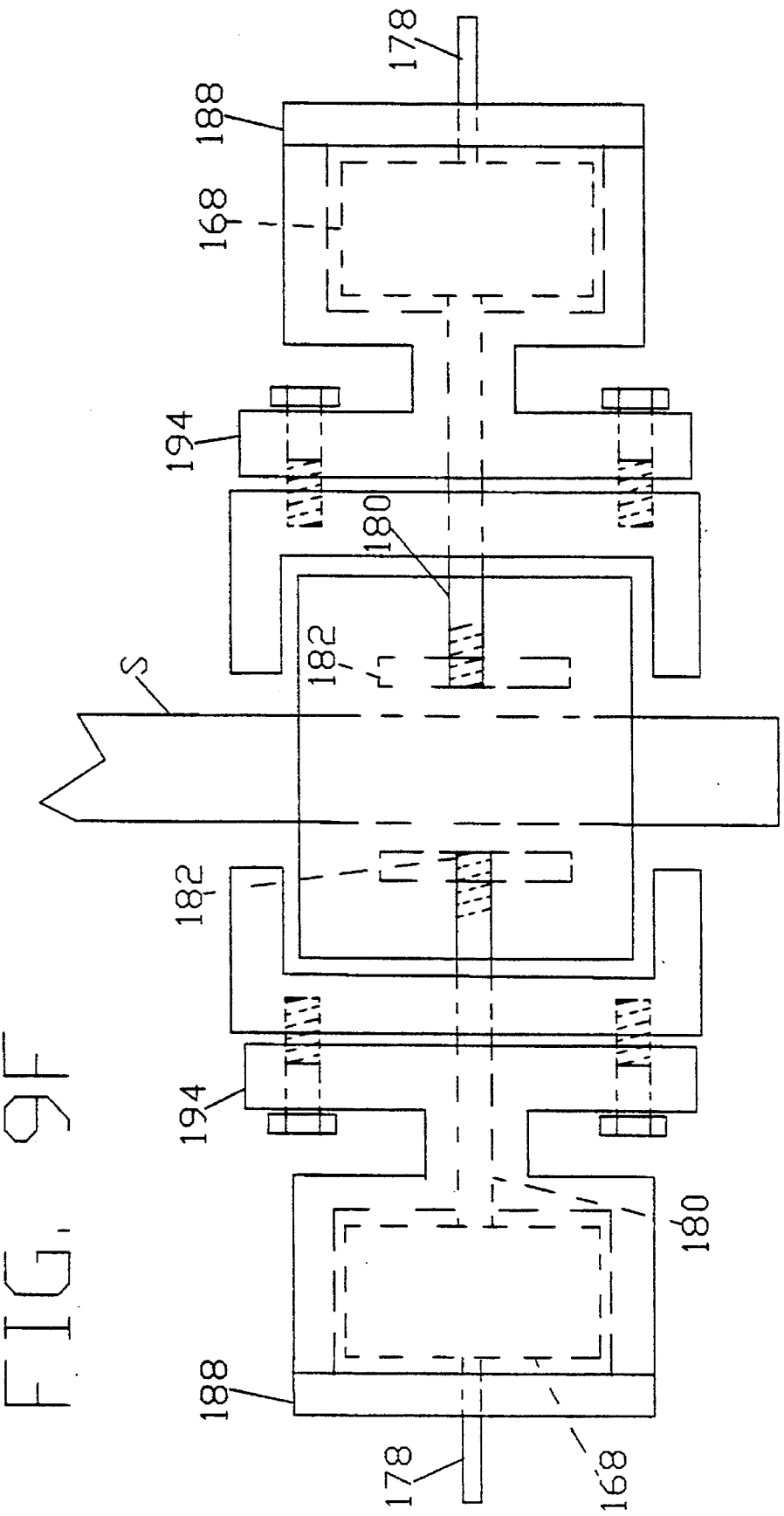

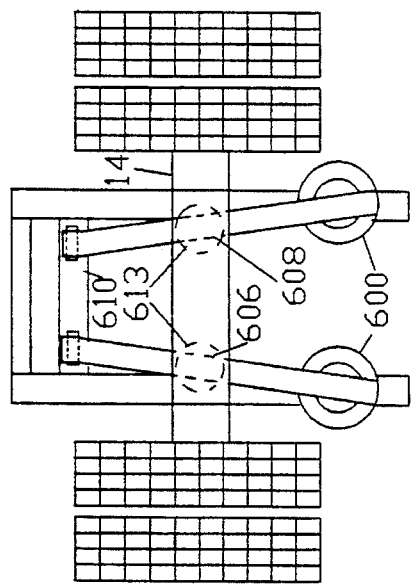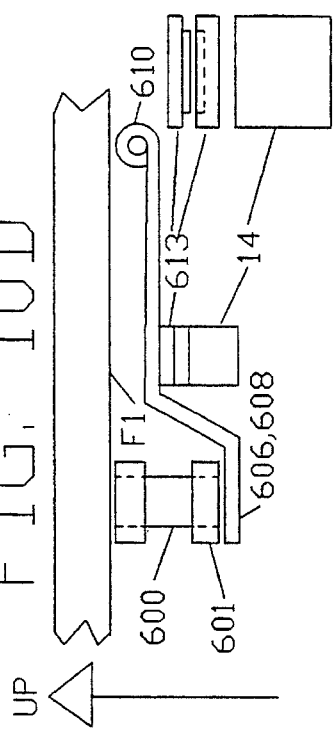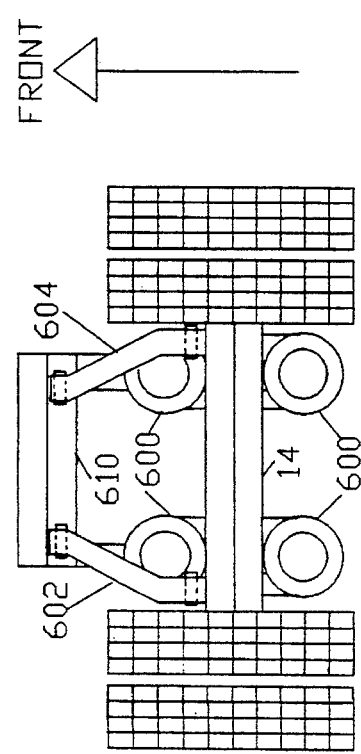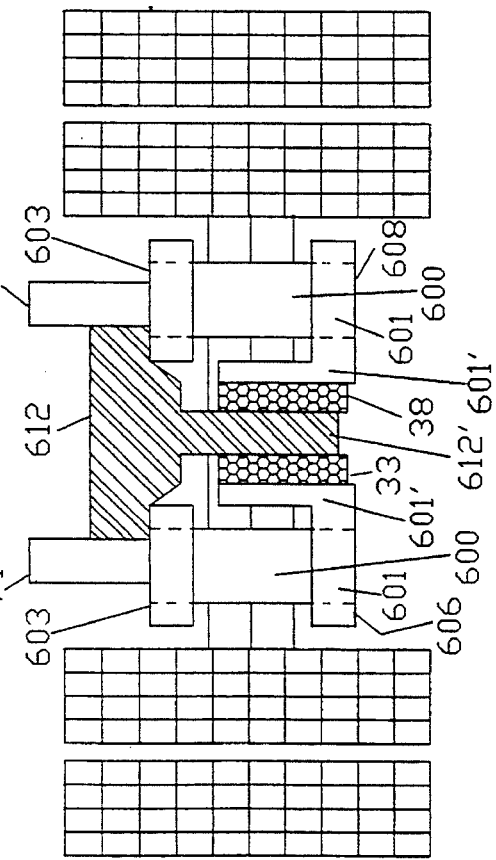

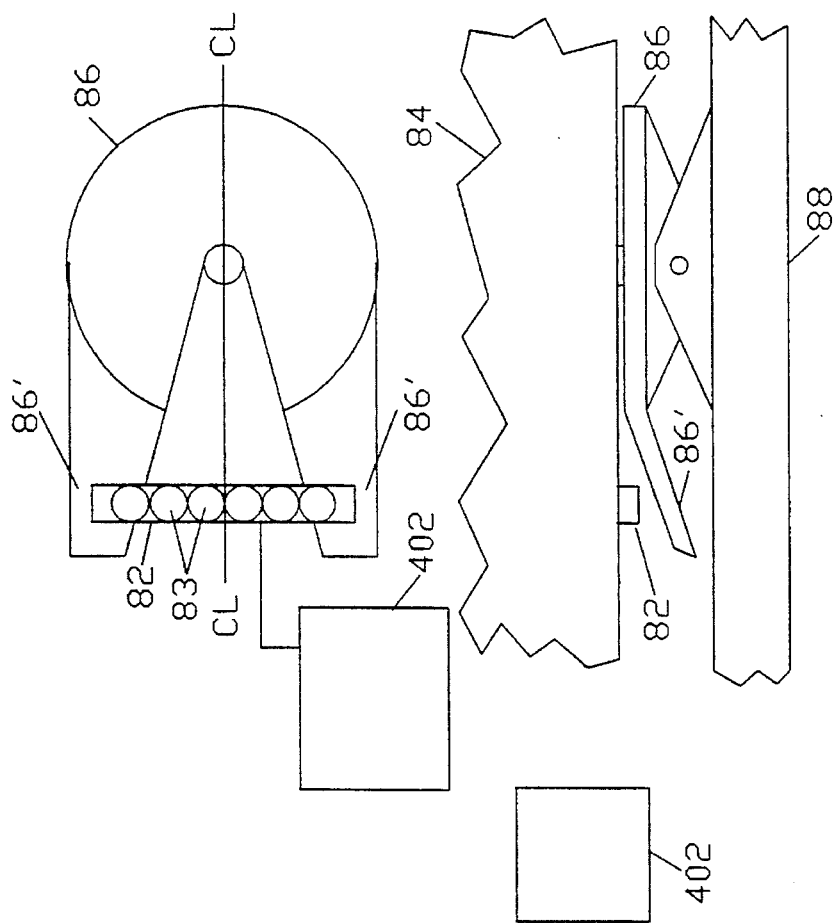
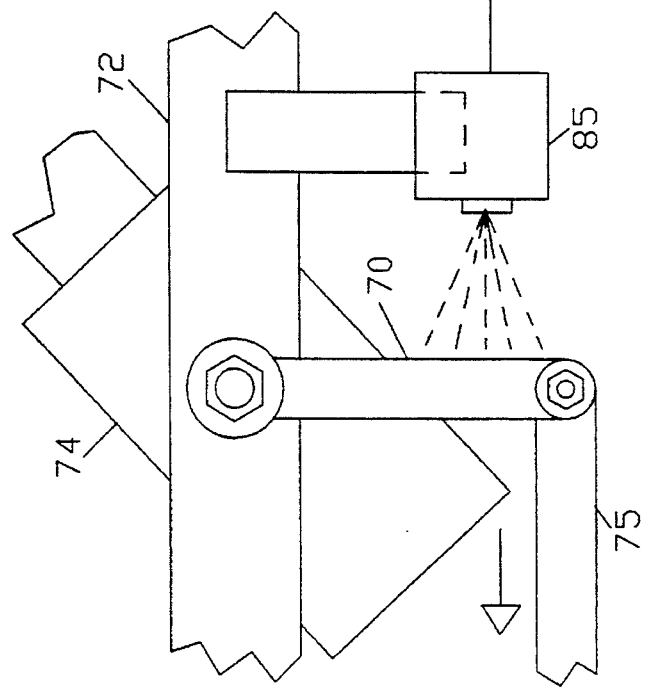

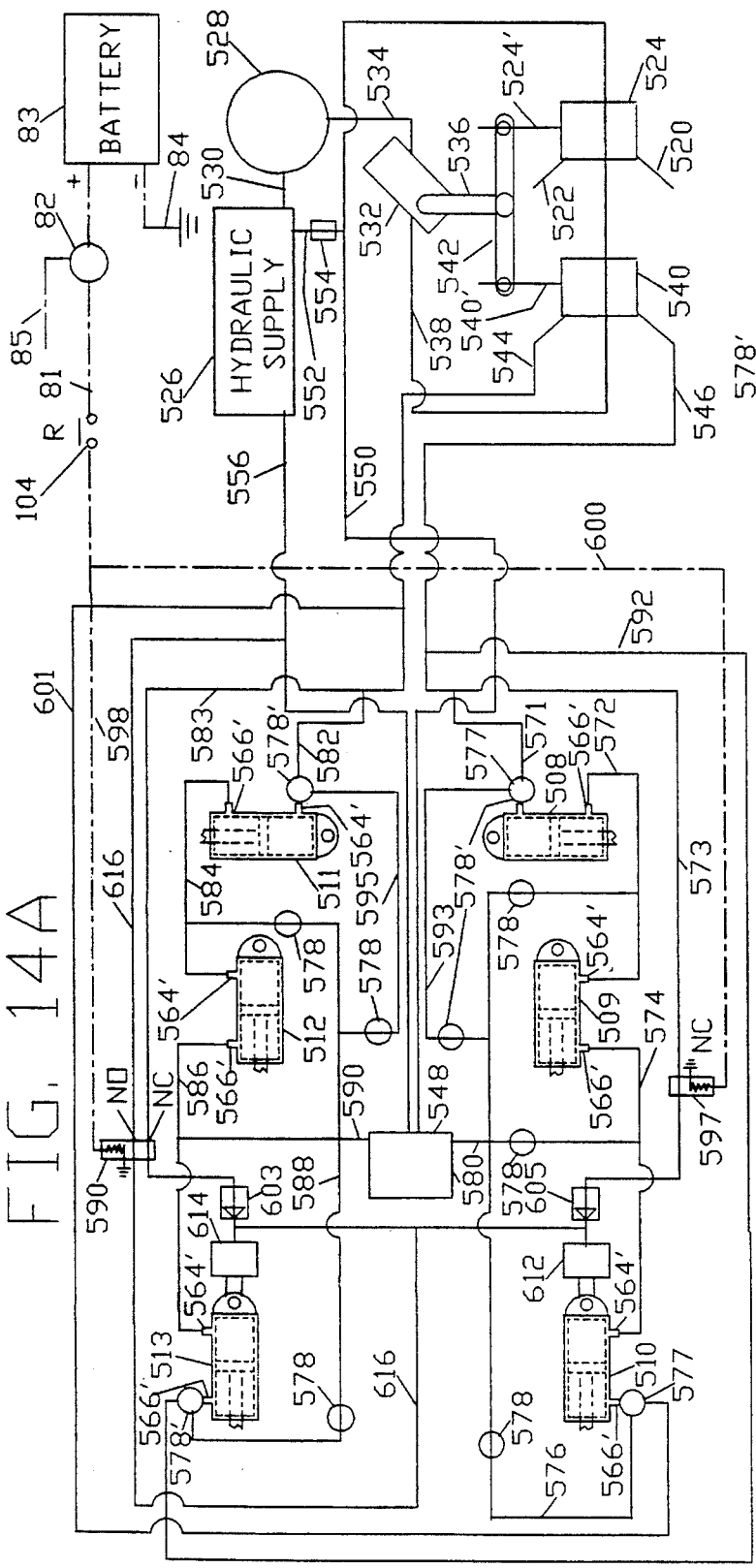

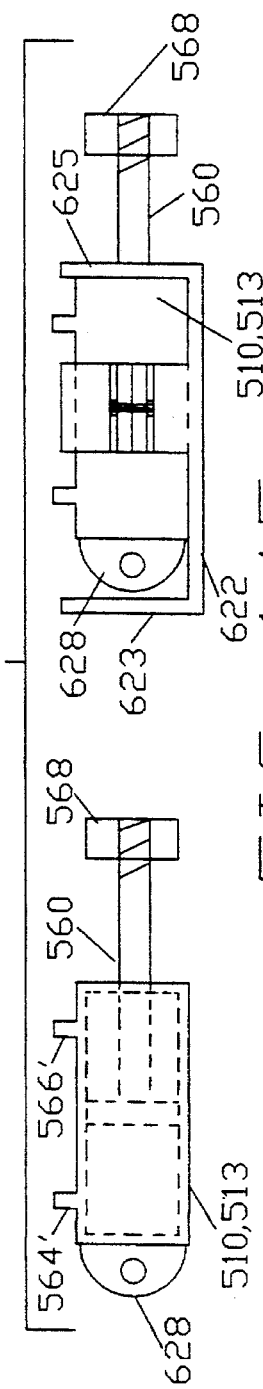
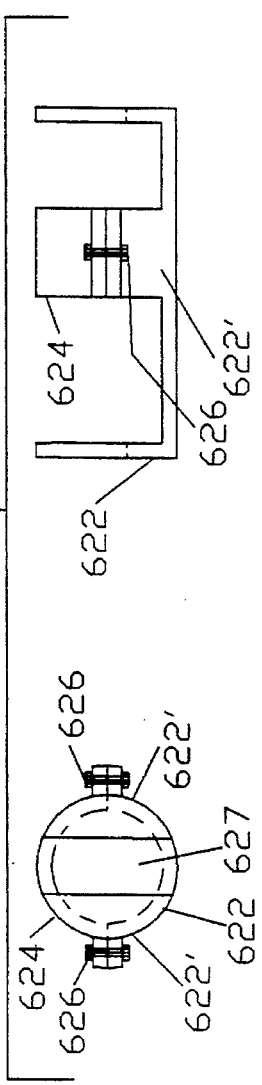
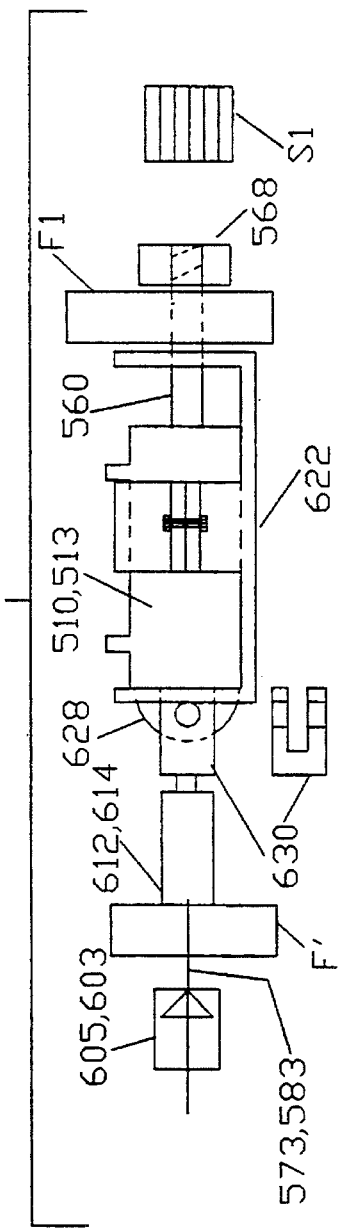
FIG. 14E
FIG. 14F
FIG. 14G

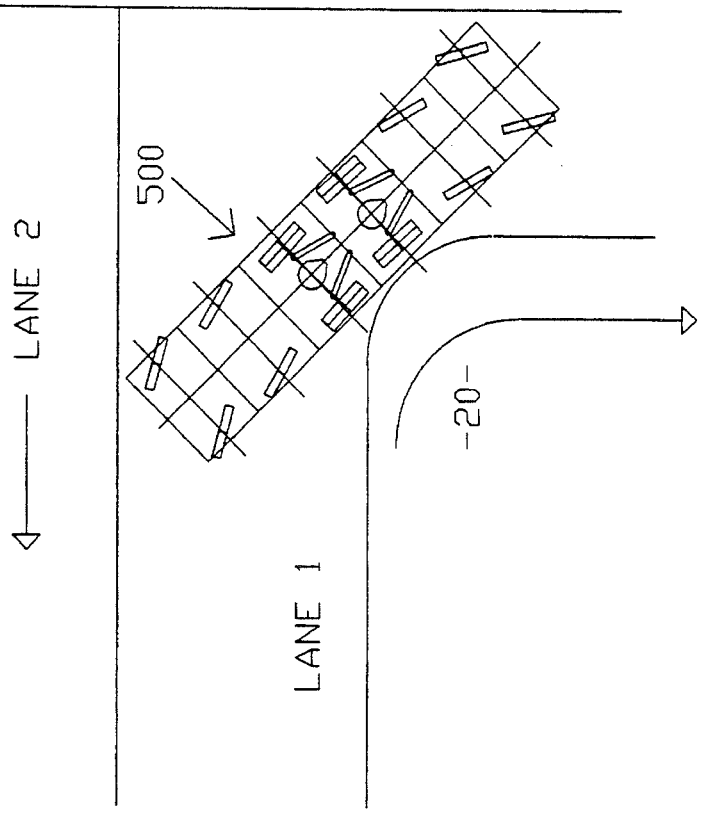
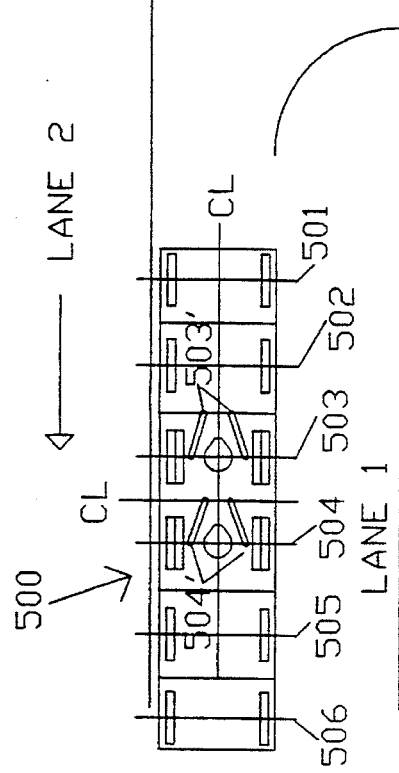

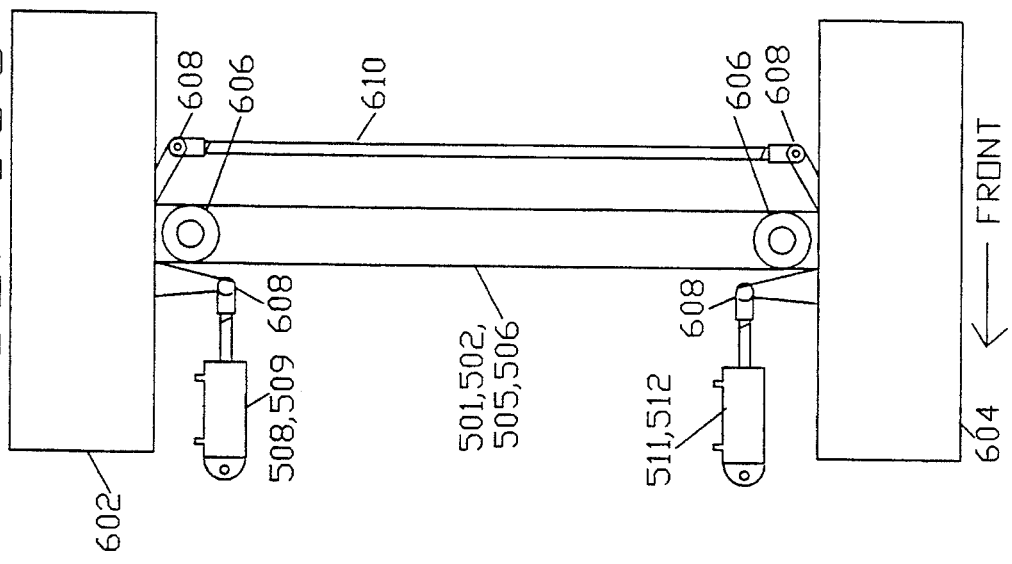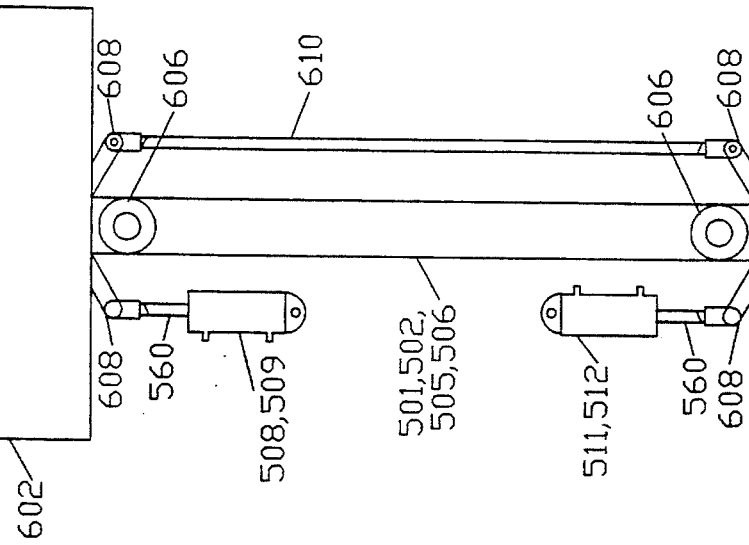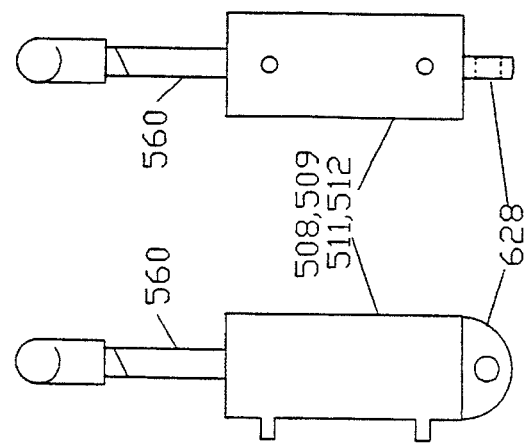

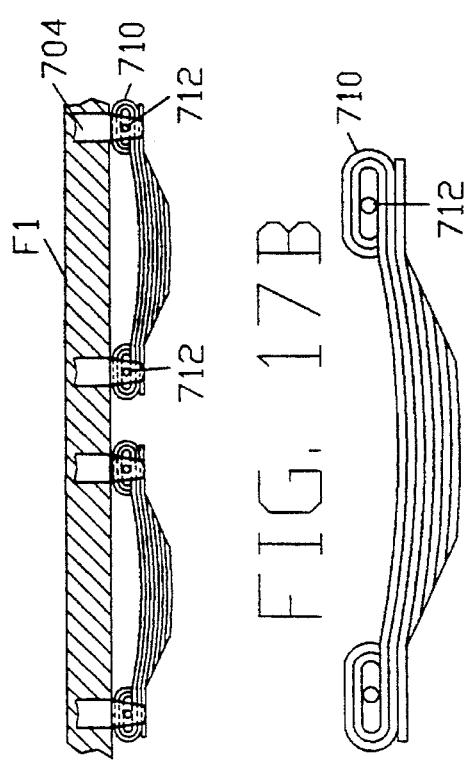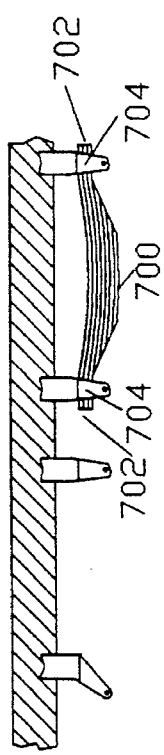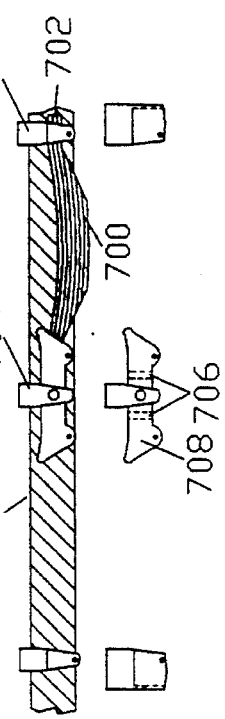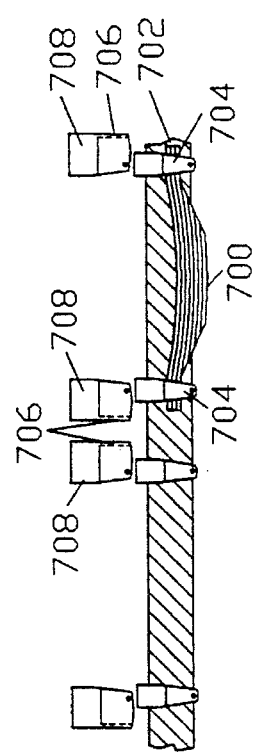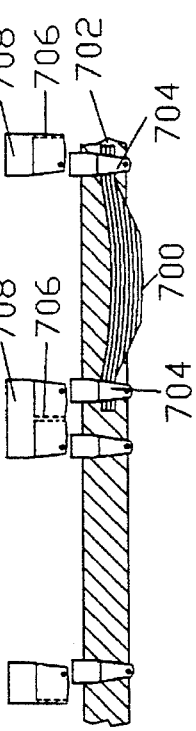

POWERED, AUTOMATIC, SELF-TRACKING SYSTEM FOR THE REAR AXLES OF TRUCKS, TRAILERS AND BUSES

BACKGROUND OF THE INVENTION

This invention relates to vehicle suspension systems and, more particularly, to powered, automatic control system for causing the rear axles of a vehicle having a long wheel base (e.g., trucks, trailers, and buses) to track around sharp corners. In this respect, this invention is an improvement over the invention disclosed in U.S. Pat. No. 5,220,972, issued to the present inventor on Jun. 22, 1993 and entitled "Self-Tracking, Rear Vehicle Suspension System For Trucks, Trailers and Buses", the entire disclosure thereof being incorporated herein by reference.

The invention of the '972 patent teaches the making of self-tracking rear axles through angling of the torsion rods coupled with means for permitting lateral deflection of the suspension type employed on the vehicle (e.g., widening of the spring hangers on a vehicle employing a leaf-spring type suspension). More particularly, the forward ends of each pair of laterally spaced torsion rods are moved inwardly toward each other to create separate reaction forces which cause the associated axle to pivot with respect to the vehicle centerline in a direction away from the turn during cornering. Consequently, the rear tires rotate closely along the line of travel of the front tires such that the rear tires track around the corner and, as such, the driver can safely negotiate a turn without having to use two lanes of traffic as drivers of such vehicles normally do when making sharp turns.

The present invention improves upon the '972 system by adding power controls which automatically respond to cornering of the vehicle by applying a controlled, measured force against selected points of the vehicle's suspension system which further assist in pivoting the rear axle(s) in the appropriate direction, thereby causing the respective rear tires to self-track into the turn, in both forward and rear directions of travel. The invention also has applications in specialized, military-type vehicles having multiple steering axles at both the front and rear of the vehicle.

SUMMARY OF THE INVENTION

It is a principal object of the present invention to provide a powered, automatic, self-tracking system for the rear axles of trucks, trailers and buses which is operable to automatically pivot the rear axles in response to movement of selected steering parts of the vehicle.

It is a further object of the present invention to provide a rear axle self-tracking system of the above type which is operable in both the forward and reverse directions of vehicle travel.

It is another object of the present invention to provide a rear axle self-tracking system of the above type which is operable to sense right verses left hand turns, and forward verses reverse directions of travel, and is thus operable to pivot the rear axles in the correct corresponding direction to cause the rear wheels to track around corners.

Other objects will in part be obvious and in part appear hereinafter.

In accordance with the foregoing objects, the invention comprises a powered, automatic, self-tracking system for the rear axles of trucks, trailers and buses. The term "self-tracking" refers to the rotation of the rear wheels along an arcing path circumscribing the corner being negotiated. This is accomplished through pivoting of the rear axles with respect to the vehicle center line in a direction away from the turn as the rear axles approach and complete a turn. In the self-tracking system of my prior U.S. Pat. No. 5,220,972, self-tracking of the rear axles is accomplished through angling of the vehicle's torsion rods in combination with widening of the spring hangers to permit lateral deflection of the ends of the leaf springs. As the vehicle turns, separate reaction forces are created at the forward ends of the torsion rods which pivots the associated axle in a direction allowing the rear wheels to turn the corner without skidding or riding up on the curb.

The present invention improves upon this self-tracking system by adding automatic power controls which are operable to apply a measured force to selected points of the suspension system in response to movement of preselected steering components of the vehicle so that the rear wheels will follow in substantially the same arcing path as the front wheels. As with the self-tracking system of the '972 patent, the automatic power controls of the present invention may be retro-fit to an already existing vehicle and, in this respect, several embodiments of power controls are disclosed herein as they relate to the type of suspension system employed or desired on a particular vehicle.

In each of the embodiments disclosed, a motion detector is positioned adjacent a pre-selected, movable steering component of the vehicle (e.g., the pitman arm or "fifth wheel" of a tractor-trailer). The motion detector is operable to sense the direction and degree of vehicle turning and is ultimately connected to a plurality of strategically placed axle-pivoting mechanisms which are operable to exert measured yet varying forces against preselected components of the vehicle's suspension system, the forces exerted by the axle-pivoting mechanisms act to pivot the associated axle in a direction causing the associated rear wheels to track along the path of the front wheels.

Selected ones of the axle-pivoting mechanisms are activated by the detector depending on whether the vehicle is turning right or left to thus assist in pivoting the axle to the left or to the right, respectively, in the forward travelling direction. Furthermore, the detector causes the axle-pivoting mechanisms to exert a force against the associated suspension component by an amount directly proportional to the degree of turning of the steering mechanism as sensed by the motion detector. As such, the greater the degree of the turn, the greater the force upon the suspension components by the axle-pivoting mechanisms, and thus the greater the pivot action of the associated axle(s). As the driver turns the wheel toward a neutral position, the axle-pivoting mechanisms relieve the force against the suspension components and the angled torsion rods take over to maintain the axles in a self-tracking configuration until the turn is completed.

Means are also provided to pivot the rear axle(s) in the opposite direction when the vehicle is shifted into reverse, as compared to when the vehicle is traveling in a forwardly direction which acts to steer the rear wheels into a reverse turn.

BRIEF DESCRIPTION OF THE DRAWINGS

FIG. 5 is a fragmented, diagrammatic plan view showing the three rear axles of the vehicle of FIGS. 1–4, and a first preferred placement of the axle pivoting mechanisms of the invention;

FIG. 6B is a composite, fragmented, elevational view of the reverse switch mechanism and associated wiring of the automatic control system;

FIG. 7 is a diagrammatic plan view showing the pivoting action of the three rear axles of a vehicle during a reverse turn using the present invention;

FIG. 8A is a simplified, partly fragmented plan view of a rear axle showing optional front and rear placements of two different types of pneumatically operated axle-pivoting mechanisms;

FIG. 8B is a rear, elevational view of FIG. 8A, except in this view the spring hangers are mounted beneath the frame;

FIG. 9A is a composite view of a novel square-shaped pneumatic axle-pivoting mechanism;

FIG. 9B is a composite view of a novel rectangular-shaped pneumatic axle-pivoting mechanism;

FIG. 9C is a composite view of a circular-shaped pneumatic axle-pivoting mechanism;

FIG. 9D is an elevational view of the square and circular-shaped pneumatic axle-pivoting mechanisms of FIGS. 9A and 9C, respectively, positioned within a spring hanger on either side of a leaf spring end;

FIG. 9E is a composite view of a specialized retaining and mounting bracket for the circular pneumatic mechanism of FIG. 9C;

FIG. 9F is a partly fragmented plan view of the mechanisms and brackets of FIGS. D, C and E installed on a spring hanger in the intended manner;

FIG. 10A is a simplified plan view of a rear axle having a four air-bag suspension;

FIG. 10B is a rear view thereof;

FIG. 10C is a plan view of a rear axle having a two air-bag type of suspension;

FIG. 10D is a composite, side elevational view of the air-bag system of FIG. 10C;

FIG. 12 is a fragmented, side elevational view of an ultrasonic motion detector for use in a selected automatic control system and shown mounted adjacent the pitman arm of the vehicle's steering system;

FIG. 13 is a fragmented, composite view of a magnetically operated motion detector for use in a selected automatic control system and shown positioned adjacent the fifth wheel of a tractor-trailer;

FIG. 14A is a simplified schematic of a third, electrohydraulic operated embodiment of the automatic control system;

FIG. 14B is a cross-sectional view of a three-way valve employed in the system of FIG. 14A;

FIG. 14C is a diagrammatic view showing the input/output lines of the second fluid reservoir of the system of FIG. 14A;

FIG. 14D is an enlarged, side, elevational view of the hydraulically controlled axle-pivoting mechanism used in the system of FIG. 14A;

FIG. 14E is a composite view in side elevation of the pneumatic mechanism of FIGS. 14A and D and a holding and mounting bracket therefor;

FIG. 14F is a composite view of the holding and mounting bracket of FIG. 14E;

FIG. 14G is a composite view of the pneumatic mechanism and bracket including the actuator therefor positioned adjacent a leaf spring end in the intended manner;

FIG. 15A is a simplified plan view of a military vehicle having six steering axles;

FIG. 15B is the view of FIG. 15A showing the vehicle midway through a right-hand turn;

FIG. 16A is a composite view of the axle-pivoting mechanism of FIG. 14D shown attached to a mounting bracket;

FIG. 16B is a plan view showing a first attachment position of the mechanisms of FIG. 16A to the axle steering linkages of a respective axle;

FIG. 16C is a plan view showing a second attachment position of the mechanisms of FIG. 16A to the axle steering linkages of a respective axle; and FIGS. 17A–F are side elevational views of a modified leaf-spring system and frame (fragmented) to which it is mounted.

DETAILED DESCRIPTION

Figure 1:
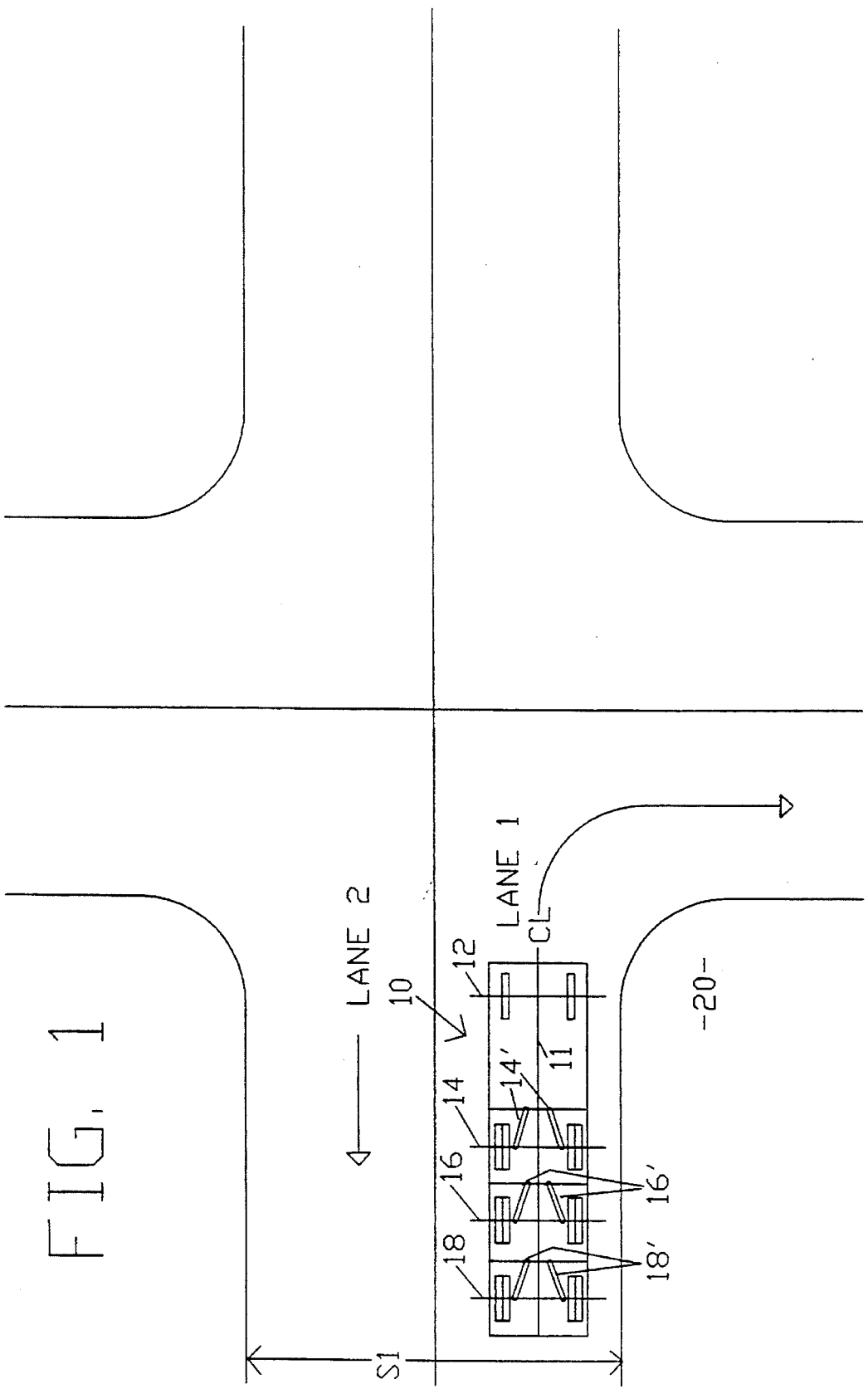
FIGS. 1–4 are diagrammatic plan views of a vehicle having three rear axles and showing the respective pivoting action thereof accomplished using the present invention through a right-hand turn of the vehicle.

There are basically three different embodiments of automatic control systems disclosed herein; namely, pneumatic, hydraulic and electric, with the type of system chosen depending on the needs and desires of the user. For example, in an existing vehicle having an air brake system, the pneumatic control system may be chosen since it can use the already existing compressed air source on the vehicle making it more economical to install and operate.

Generally speaking, in each of the systems disclosed, a motion detector placed in proximity to a preselected steering component is operable to sense and distinguish between both right and left hand turns of the vehicle, in addition to being able to detect the degree of vehicle turning. The motion detector ultimately connects to a plurality of strategically placed axle-pivoting mechanisms which are operable to apply a measured yet variable force against a preselected suspension part to pivot the associated rear axles in a directly correlative manner. That is to say, the degree to which the rear axles are caused to pivot by the axle-pivoting mechanisms is directly proportional to and substantially synchronous with the degree to which the vehicle is turned as sensed by the motion detector.

Referring now to the drawings, there is seen in FIGS. 1–4 a vehicle 10 employing the present invention and having a front axle 12 and three rear axles 14, 16 and 18 to illustrate the pivoting action thereof through a right hand turn of the vehicle at a street corner 20. For illustration purposes, vehicle 10 is shown as a non-articulated, heavy duty truck although it is understood that the present invention works equally as well on other types of long-bodied vehicles having one or more rear axles (e.g., tractor-trailers, buses, limousines, etc.). City driving presents a special difficulty to these types of vehicles due to their body size and length, with the vehicles typically requiring two lanes of traffic to make a right-hand turn. This is primarily due to the fact that modern day suspension systems hold the rear axles on these vehicles in a substantially perpendicular relationship with respect to the vehicle's longitudinal center-line $C_L$ (along which the drive shaft lies) and, as such, the rear of the vehicle does not follow in the same path as the front of the vehicle. Consequently, should the vehicle attempt the turn without using the second lane, it would cut the corner short during cornering, thereby causing the rear wheels to skid and ride off the street and onto the street corner.

The present invention provides a self-tracking system for the rear axles of these vehicle types, the system being operable to automatically pivot the rear axles in a direction away from the corner as the axle approaches and is at the corner, and then pivot back towards the corner once the axle has passed the corner and the driver is straightening out the vehicle. In this way, the corresponding rear wheels follow the path of the front wheels very closely around the turn, thereby avoiding striking or riding over the corner during the turn. The invention also has applications to vehicles having multiple steering axles which will be discussed later.

Referring again to FIG. 1, vehicle 10 is seen to be occupying a right lane (Lane 1) of a street $S_1$ having a second lane of traffic (Lane 2) extending longitudinally adjacent thereto. Vehicle 10 at this point has approached corner 20 but has not yet begun turning. As seen, the forward ends of the torsion rod pairs 14', 16' and 18' of each axle 14, 16 and 18, respectively, are positioned laterally inwardly towards the vehicle center-line $C_L$ in accordance with my previous invention as shown and described in U.S. Pat. No. 5,220,972. Also, although not shown in FIGS. 1–4, means are provided to permit lateral deflection of the springs (and/or other suspension parts) of the vehicle which assist the associated axles to pivot with respect to the vehicle center-line $C_L$, several such means also being disclosed in the '972 patent. Furthermore, and very importantly, it is the automatic power controls of the present invention which apply an additional, measured force of varying magnitude to selected suspension parts in response to movement of selected steering parts on the vehicle as will be described in detail below. The preferred, more widely used method of axle pivoting using the automatic power controls of the present system involves placing a plurality of axle-pivoting mechanisms to act on the springs of the vehicle to enhance the controlled, lateral deflection thereof which directly assists the pivoting action of the associated axles. These automatic power controls provide a more responsive, enhanced, efficient and smooth pivoting action of the rear axles not previously achieved with the system of the '972 patent alone.

Figure 2:
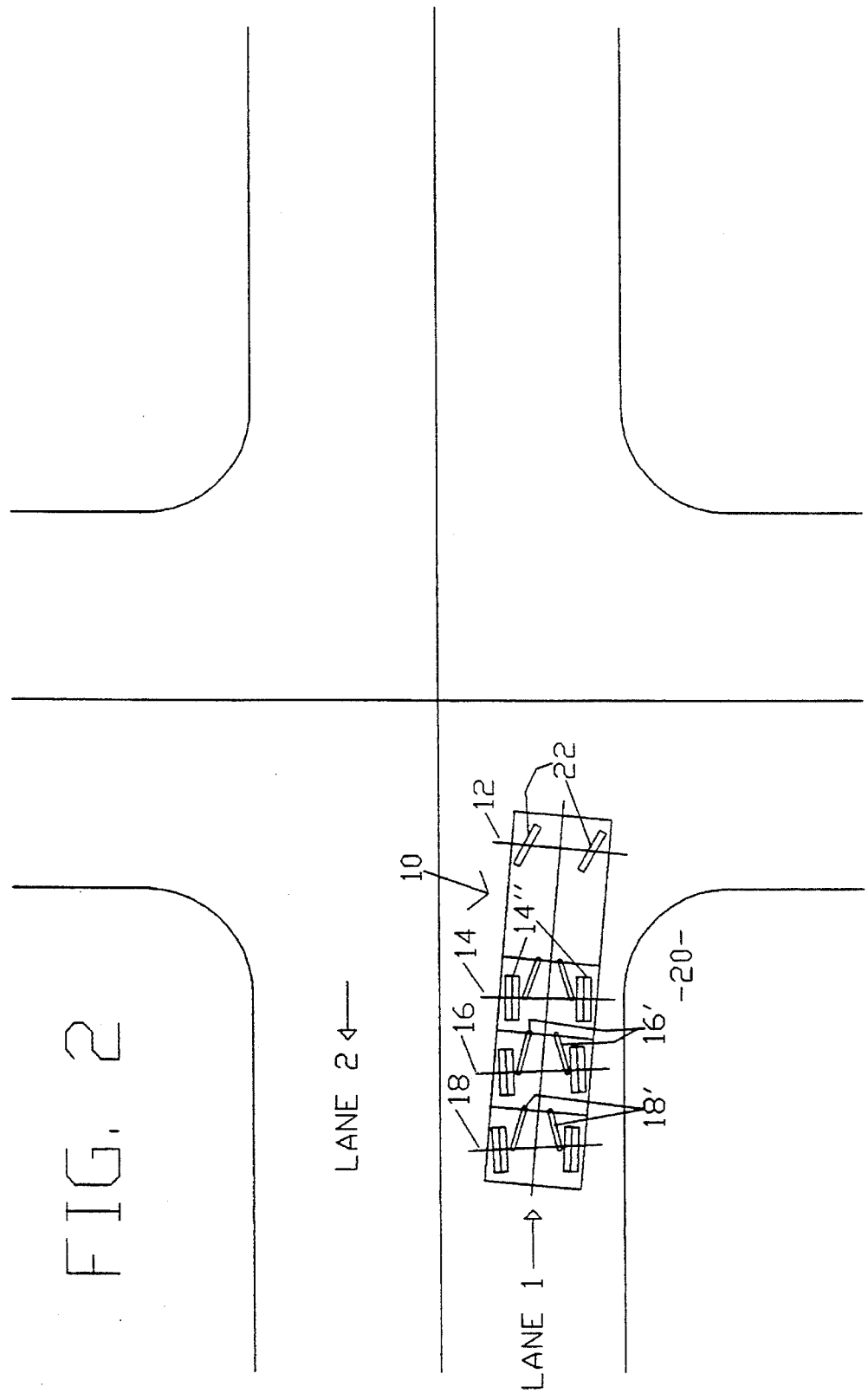

In FIG. 1, the vehicle 10 has not yet begun to turn and there is thus no appreciable movement of any steering part on the vehicle. Since the automatic power controls are activated only upon movement of a steering part, there is no measured force being exerted against the suspension parts and the rear axles assume their normally biased position of a perpendicular orientation to the vehicle's center-line $C_L$ along which the drive shaft 11 lies. Referring to FIG. 2, the driver has turned the pair of front steering wheels 22 to the right (clockwise) to turn around corner 20. In response to the front steering wheels 22 being turned, power is automatically applied to the first rear axle 14 to cause it to begin pivoting in the opposite direction (counter-clockwise) away from corner 20. This directs the associated rear wheels 14" to follow closely the path of the front steering wheels 22, thereby preventing wheels 14" from cutting corner 20 short. Second and third rear axles 16 and 18 will also pivot in the same direction as first rear axle 14 and self-track around the turn due to the forces exerted by torsion rods 16' and 18' alone. (Axle-pivoting mechanisms are also provided at axles 16 and 18, but are only needed and thus activated when the vehicle is travelling in reverse as will be set forth more fully below).

Figure 3:
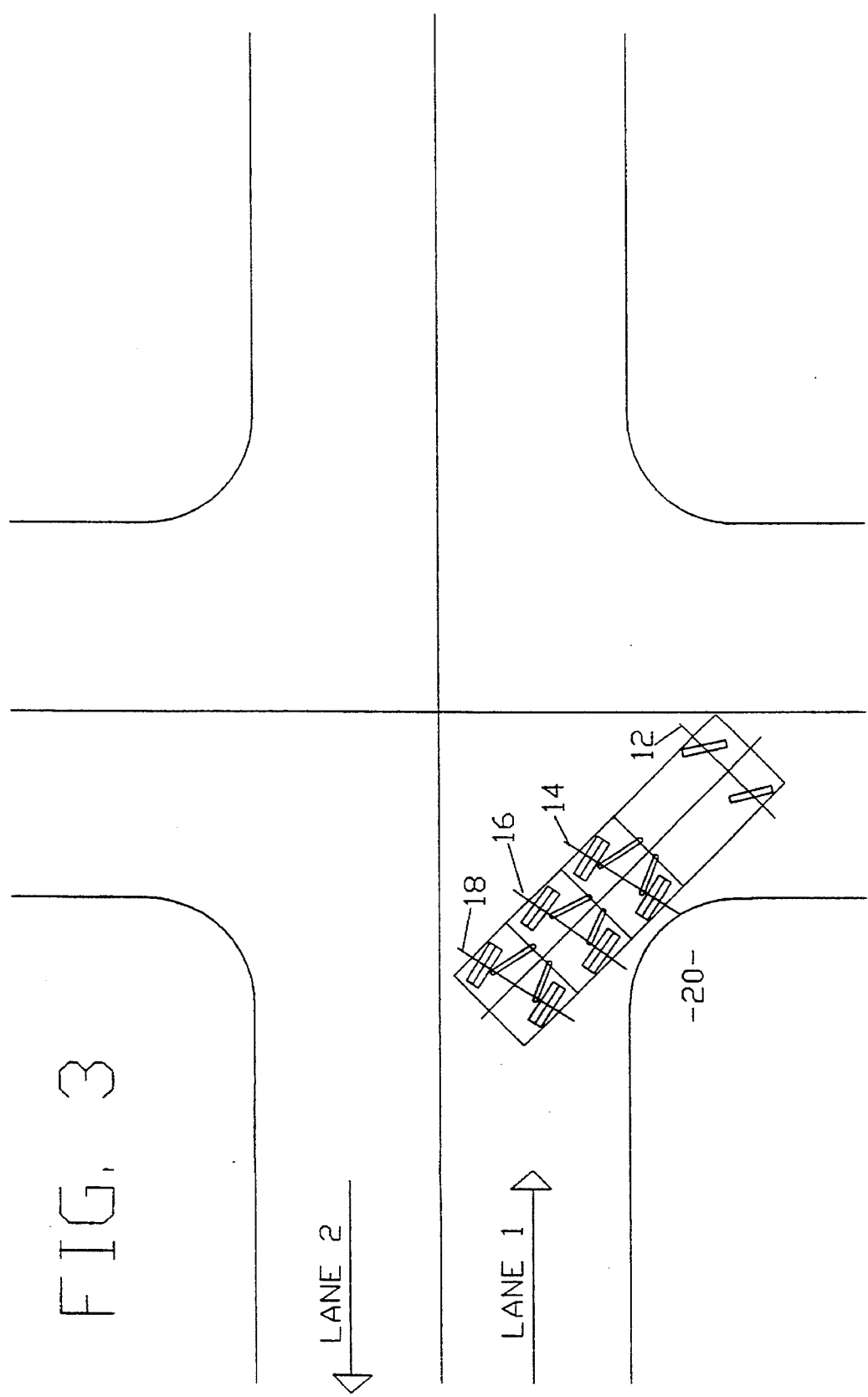
Figure 4:
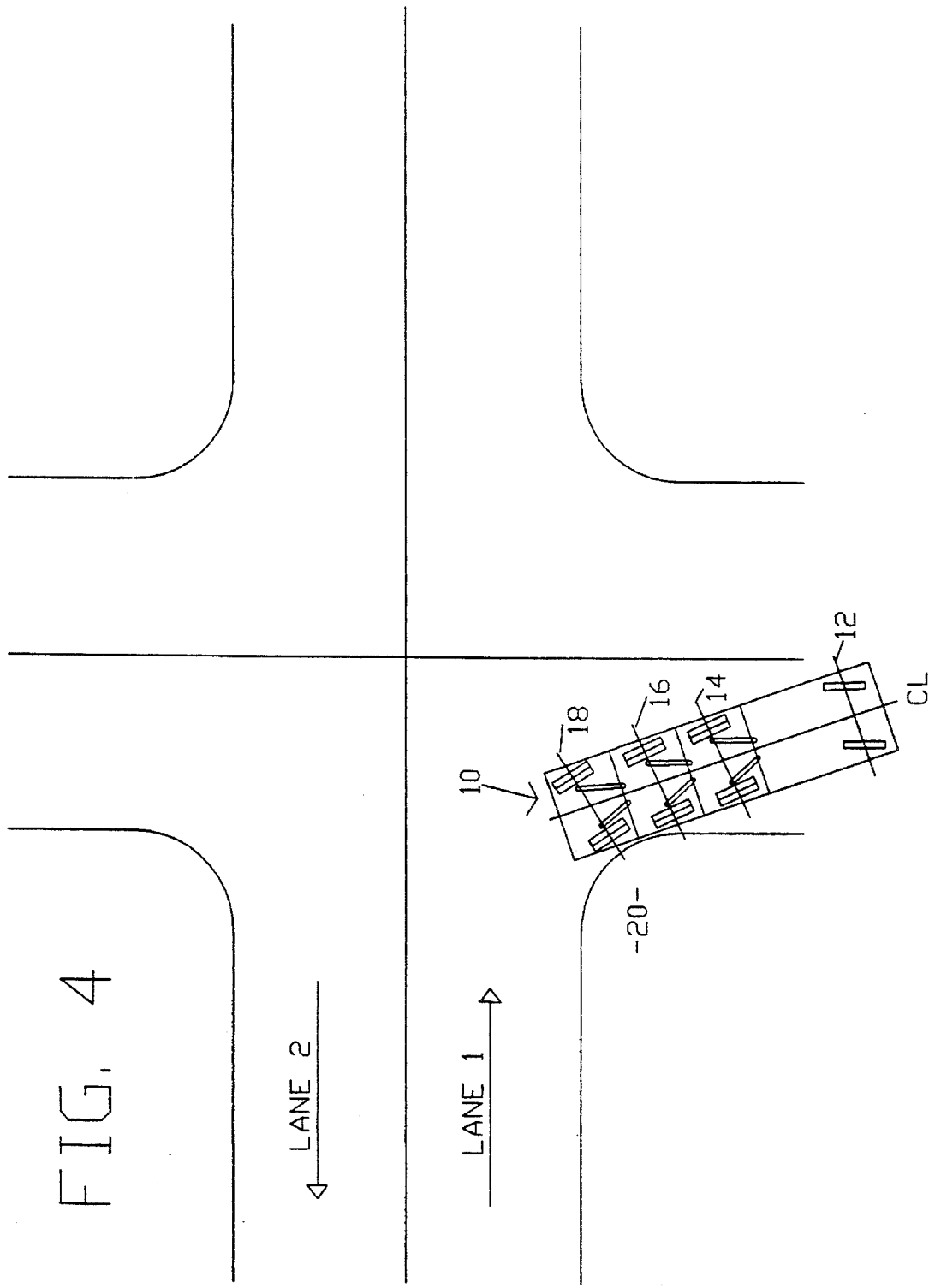

Referring to FIG. 3, vehicle 10 has completed approximately 50% of the turn and the power being applied to first rear axle 14 is at a maximum. From this point on the driver will be moving the steering wheel in the opposite direction to straighten front wheels 22. As the steering thus moves in the opposite direction, the power is slowly being released and axle 14 begins to pivot in the opposite direction towards corner 20. Second and third rear axles 16 and 18 are still self-tracking, with both axles 16 and 18 still pivoted away from the corner which directs the rear of vehicle 10 around corner 20. In FIG. 4, vehicle 10 has completed about 90% of the turn and the driver has almost completely straightened front wheels 22. At this point, power is no longer being applied to first axle 14 and all three rear axles are self-tracking (by virtue of their respective torsion rods alone) and returning to their originally biased, perpendicular orientation with respect to the vehicle center-line $C_L$.

Having briefly explained the pivoting action of the rear axles around a 90° turns which is attributable to the unique positioning of the associated torsion rods regarding rear axles 16 and 18, and to both the positioning of the associated torsion rods 14' and the power controls regarding first rear axle 14, attention is turned specifically to the power control system of the present invention. Several different control systems will be set forth below with it being understood that the various systems described herein may be interchanged with each other depending on the type of vehicle and the needs and desires of the user. In each of the systems disclosed, a motion sensing mechanism is positioned adjacent a preselected steering part which ultimately connects to and activates a plurality of mechanisms operable to exert a controlled force against preselected suspension parts which automatically pivot the associated axle in response to movement of the preselected steering part. Means are provided to sense both right and left-hand turns in addition to reverse operation of the vehicle with the system reacting accordingly to pivot the axle in the correct direction.

Referring now to FIG. 5, a first preferred positioning of the axle-pivoting mechanisms (which are only symbolically represented in FIG. 5 and labeled by numerals 32–43) is illustrated in the same vehicle 10 as shown in FIGS. 1–4 having three rear axles 14, 16 and 18 and which includes a leaf-spring type suspension having leaf spring pairs $S_1$, $S_4$; $S_2$, $S_5$; and $S_3$, $S_6$ connected to each associated rear axle 14, 16 and 18, respectively, at substantially the centers of the springs. It is noted that each rear axle 14, 16 and 18 is divided into co-linear halves interconnected by a differential gear box 44, 46 and 48, respectively, in a known manner.

In the embodiment of FIG. 5, a pair of axle-pivoting mechanisms are situated on opposite sides of the rear end of each of the springs $S_1$–$S_6$. Although the structural and operational relationship between the axle-pivoting mechanisms and the springs will be set forth in greater detail below in conjunction with discussion of the different automatic control systems themselves, the general operational relationship between the direction of vehicle travel and steering, and the corresponding actuation of the axle-pivoting mechanisms and the direction of axle pivot, may be realized by reference to FIGS. 1–5. For example, in response to a right-hand turn of the vehicle 10 as illustrated in FIGS. 1–4, axle-pivoting mechanisms 32 and 38 (FIG. 5) are activated substantially simultaneously which exerts a force of a magnitude proportional to the degree of turning and in a direction laterally against the sides of the rear ends of springs $S_1$ and $S_4$, respectively, in accordance with their respective arrows. This force causes associated springs $S_1$ and $S_4$ to pivot slightly in a counter-clockwise direction about their respective couplings to axle 14. This pivoting movement in combination with the inwardly angled front ends of torsion rods 14' causes associated axle 14 to pivot in the counter-clockwise direction which is opposite to the direction of the turn. During a left-hand turn, the axle-pivoting mechanisms 33 and 39 would instead be activated to push against the rear ends of springs $S_1$ and $S_4$ in accordance with the respective arrows and thus cause axle 14 to pivot in the clockwise direction away from the turn. As aforementioned, second and third rear axles 16 and 18 mimic the pivot of first rear axle 14 during forward travel due to the forces acting on torsion rod pairs 16' and 18' alone. The axle-pivoting mechanisms on rear axles 16 and 18 will be discussed below in conjunction with discussion of the automatic control systems during reverse operation of the vehicle.

Figure 6A:
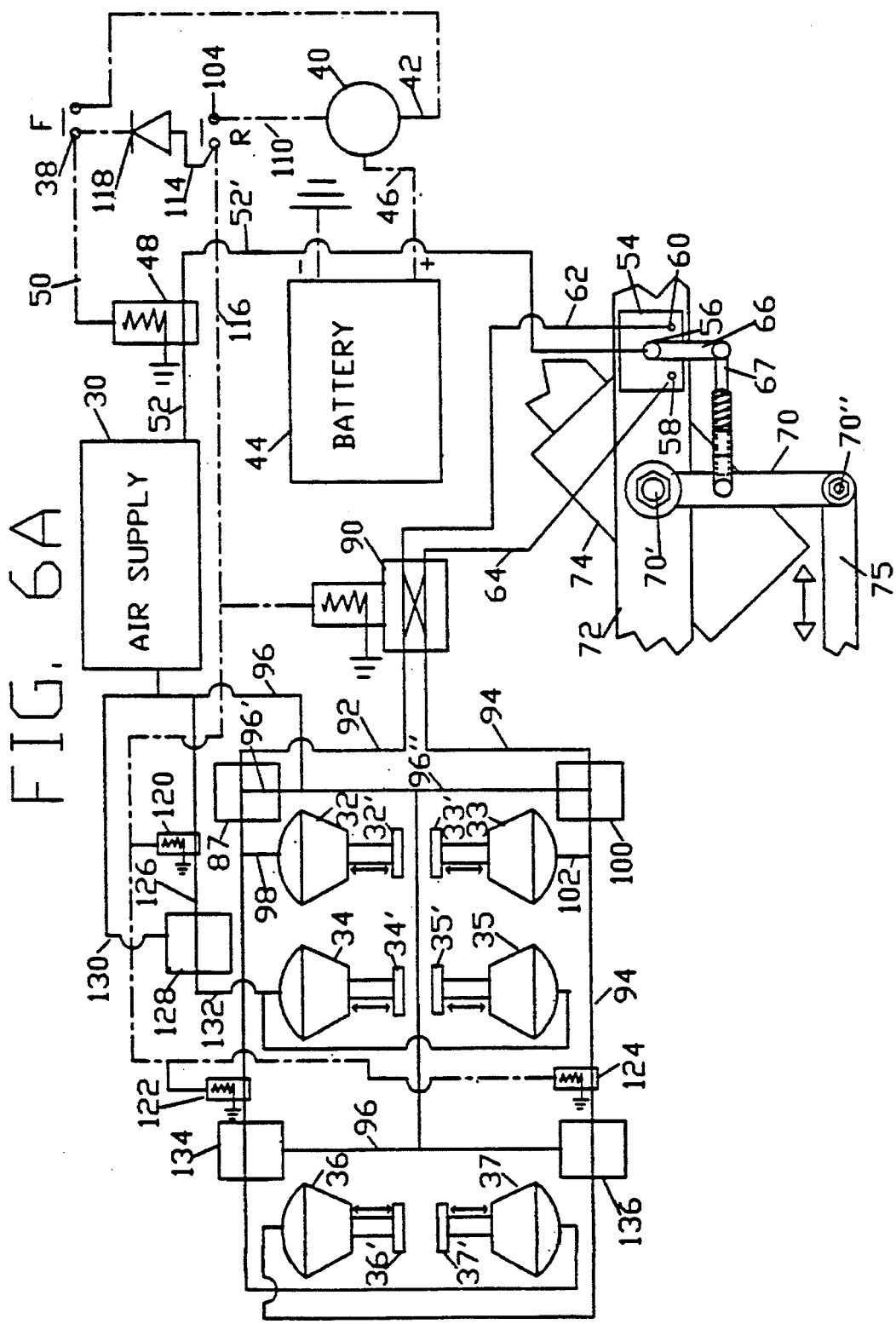
FIG. 6A is a simplified schematic, with some parts broken away, of a first, electro-pneumatically operated embodiment of the inventive automatic power control system for self-tracking rear axles.

Referring to FIG. 6A, a first, electro-pneumatically operated automatic control system is shown. In this embodiment, compressed air from an air supply 30 is used to actuate the plurality of axle-pivoting mechanisms 32–37 which are positioned adjacent the springs $S_1$, $S_2$ and $S_3$ on the left side of vehicle 10 as seen in FIG. 5. The axle-pivoting mechanisms 38–43 located adjacent springs $S_4$, $S_5$ and $S_6$ are not shown in FIG. 6A for the purpose of clarity, it being understood that the system of FIG. 6A includes connections to mechanisms 38–43 also such that they are activated simultaneously with mechanisms 32–37 in the respective manner described. Also, for the purpose of description, the axle-pivoting mechanisms 32–37 in FIG. 6A are shown as conventional air brake cylinder and piston assemblies each having a respective bearing plate 32'–37' attached to the terminal ends of the pistons thereof. It is understood, however, that other types of pneumatically operated axle-pivoting mechanisms may be interchanged with one or more of the cylinder and piston assemblies 32–37 shown in FIG. 6A, with the type of mechanism chosen depending on the requirements and likes of the user. For example, a uniquely configured bellows-type mechanism is shown and will be described in detail below with regard to FIGS. 9A–F, with this type of mechanism being chosen where space is a concern due to its relatively small and compact size.

Referring back to the system of FIG. 6A, in order for the system to become enabled in the forward direction, the driver closes switch 38 which is located in the cab of the vehicle (not shown) within arm's reach of the driver, switch 38 being electrically connected at one end thereof to the vehicle's ignition switch 40 via electric wire 42, and ignition switch 40 being connected to the vehicle's battery 44 via electric wire 46. Switch 38 is electrically connected at the opposite end thereof to a solenoid valve 48 via electric wire 50. Normally closed solenoid valve 48 connects to an air line 52 between compressed air source 30 and a proportioning valve 54. Compressed air source 30 may be the existing source on a vehicle equipped with air brakes, or may be separately provided if no such source is present. Thus, assuming ignition switch 40 is closed and the vehicle's engine is running, the manual closing of switch 38 completes an electric circuit energizing solenoid valve 48 to supply air under pressure to proportioning valve 54.

Proportioning valve 54 is seen to include a single inlet port 56 and two outlet ports 58 and 60 connecting to air lines 64 and 62, respectively, which ultimately lead to and operate pneumatic rams 32–37 in the manner to be described. Proportioning valve 54 is a commercially available part (e.g., Bendix Corp. type BP-1 brake valve modified for two-way operation) and is operable to provide a controlled, graduated pressure to either air line 62 or 64 through movement of a lever 66 rotatably connected at a first end thereof to the control port of valve 54. Lever 66 extends outwardly of the valve body with the second end of lever 66 rotatably connecting to the first end of a spring-loaded, telescoping rod assembly 67 which controls movement of lever 66 between outlet ports 58 and 60 of the proportioning valve 54. Rod assembly 67 is spring-loaded as described so as to prevent over-torquing of lever 66. Generally speaking, movement of lever 66 between outlets 58 and 60 causes air under pressure to be delivered in a directly proportional manner to air lines 64 and 62, respectively. That is to say, the distance of travel lever 66 is caused to move is directly proportional with the rate of air flow allowed to travel through lines 62 and 64.

The opposite end of rod assembly 67 is rotatably connected to the pitman arm 70 of the vehicle which itself is rotatably mounted at a first end 70' thereof to the vehicle's frame 72 adjacent the steering box 74 in the embodiment of FIG. 6A. The steering linkage 75 to which the second end 70" of the pitman arm 70 attaches moves in a substantially linear path to the front or rear upon the steering wheel (not shown) being turned to the left or right, respectively, thereby pivoting pitman arm 70 forward or rearward about anchor point 70'. Generally speaking then, as pitman arm 70 pivots in response to turning of the steering wheel, rod assembly 67 in turn pivots lever 66 either toward outlet valve 58 or 60 which thereby delivers air under pressure to either air line 62 or 64.

Figure 11A:
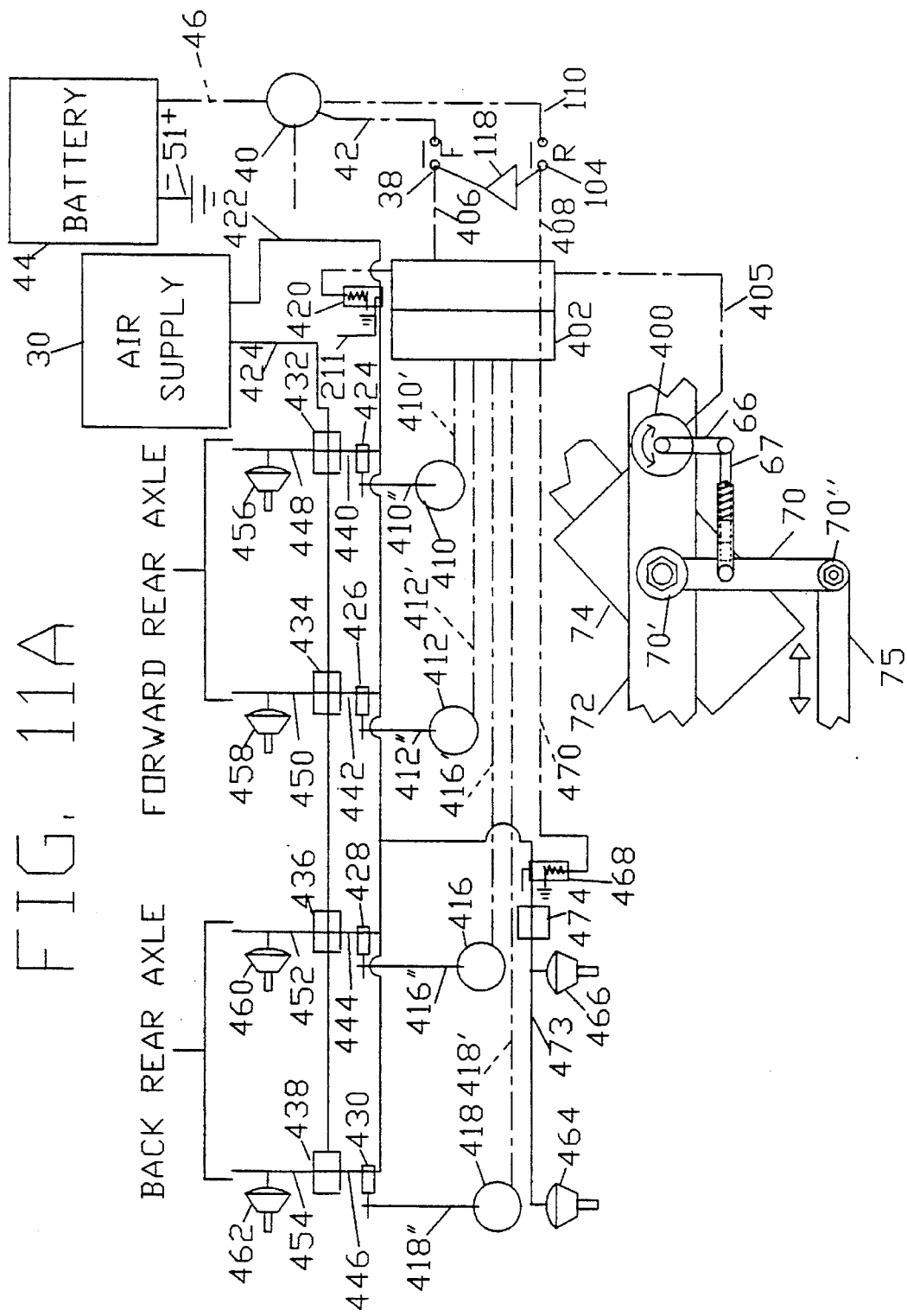
FIGS. 11A is a schematic showing another type of electro-pneumatic automatic control system which employs a plurality of stepper motors to actuate and control the pneumatic cylinders.

To briefly recap this first aspect of the system of FIG. 6A, when the driver is about to make a sharp turn, he/she closes switch 38 as previously described. The driver may keep switch 38 closed indefinitely, if desired, which would not interfere with any of the vehicle's operating systems as will be understood below. Closing of switch 38 energizes solenoid valve 48 which supplies air under pressure from source 30 to proportioning valve 54. When the driver turns the steering wheel either to the right or left, pitman arm 70 moves appropriately for right or left turns, respectively, turning lever 66 in the clockwise or counter-clockwise directions, respectively. It is noted here that mechanical linkage 70 is but one of several types of steering detectors available for use with the present invention. For example, electric, ultrasonic and magnetic sensors are seen in FIGS. 11A, 12 and 13 respectively, which will be discussed in more detail below with regard to other automatic control system embodiments presented herein. Also, the motion detector may be placed in proximity to any part of the vehicle which exhibits reciprocating movement in response to turning of the steering wheel in either direction. For example, as seen in FIG. 13, in a tractor-trailer the magnetic motion detector 82 may be mounted beneath the trailer body 84 directly over the tail of the fifth wheel 86 located on the tractor bed 88 where the trailer is hitched to the tractor. Again, detailed discussion of this sensor operation will be described in detail below.

Referring again to FIG. 6A, assuming switch 38 is in the closed position and the driver is driving in a generally straight line configuration, the steering components of the vehicle (including, among other things, steering box and arm 74 and 70, and linkage 67) are also in their "neutral", straight-line configuration as seen in FIG. 6A and linkage 67 maintains lever 66 in a position substantially half-way between outlet ports 58 and 60 such that no air under pressure is allowed to travel through either air line 62 or 64. When the driver turns the steering wheel to make either a right or left-hand turn, linkage 67 moves lever 66 towards either outlet port 58 or 60, respectively, as described above thereby allowing air to travel from source 30 through air line 62 or 64, respectively.

Assuming first the driver is making a right-hand turn, lever 66 is turned by linkage 67 to the right to cause air under pressure to be delivered from valve 54 through air line 62 which connects to a commercially available "cross-over" solenoid valve 90. As will be described more fully below, solenoid valve 90 is only energized in response to the vehicle's transmission being shifted into reverse. Thus, when the vehicle is travelling in a forwardly direction, solenoid valve 90 is in its un-energized state which connects air lines 62 and 64 directly to air lines 92 and 94, respectively. In the energized state, solenoid valve 90 crosses the air lines, i.e., valve 90 is operable in the energized state to connect air lines 62 and 64 to air lines 94 and 92, respectively. The operation of the system in FIG. 6A when solenoid valve 90 is energized will be discussed below during discussion of driving in reverse.

Thus, assuming the vehicle is travelling forwardly, solenoid valve 90 is in its un-energized state and air travels from air line 62 to air line 92 during a right-hand turn of the vehicle as previously described. Air line 92 connects and passes through a "quick release" proportioning valve 87 and connects to axle-pivoting mechanism 32 which, when actuated, responds by extending its piston to exert a measured force against a preselected suspension part to assist the pivoting of the associated axle of the preselected suspension part in a direction away from the turn (i.e., opposite to the direction in which the steering wheel is turned). Again, this opposite directional relationship between the direction of turning and the direction of axle pivot is illustrated in FIGS. 2-4 where the steering wheels of front axle 12 are turned to the right, and the rear axles 14, 16 and 18 are pivoted in the opposite direction (i.e., counter-clockwise or to the left) during cornering.

A second air line 96' which leads directly from source 30 via main line 96 connects to proportioning valve 87 and is always at full air pressure (preferably at least 100 PSI). Likewise, when solenoid 48 is energized upon closing switch 38, air lines 52 and 52' which lead to proportioning valve 54 are at full air pressure (which is, of course, the same pressure as in lines 96 and 96'). As previously described, valve 54 is operable to deliver air under pressure through lines 92 and 94 in an amount directly proportional to the degree to which lever 66 is moved toward outlets 60 and 58, respectively. It is thus understood that the pressure of the air traveling through line 92 is variable from a minimum to the maximum pressure of supply 30, and is directly proportional to the degree to which the vehicle is turned. In a like manner, proportioning valve 87 is operable to allow air under pressure to travel from line 96' to line 98 in an amount directly proportional to the amount of pressure in line 92. Thus, if lever 66 is moved 50% towards outlet 60, only 50% of the full pressure available from source 30 will be allowed to travel through to line 92, and thus valve 87 will be opened only 50% to allow 50% of the pressure in line 96' to travel to line 98 which actuates mechanism 32 to exert a force only 50% of its full potential. It may be appreciated, therefore, that the provision of a second proportioning valve attached adjacent the axle-pivoting mechanism which includes an inlet at full air pressure ensures an optimum reaction rate of the mechanism in response to steering movement.

When the driver has completed the turn and begins straightening the steering, lever 66 is moved back to the "neutral" position seen in FIG. 6A which vents air from line 92 thereby closing valve 87 which thereby also vents air from line 98 since valves 56 and 87 are of the "quick-release" type. Since the piston of mechanism 32 is biased in the retracted position, venting of line 98 causes retraction of the piston of mechanism 32, thereby releasing the force being applied to the suspension part. Since there is no longer a force being applied to the suspension to urge the associated axle to pivot, the axle returns to its normally biased position of a substantially perpendicular orientation with respect to the vehicle's centerline $C_L$.

Assuming now the driver is making a left-hand turn, linkage 67 is caused to move in the opposite direction (i.e., left) thereby moving lever 66 also to the left towards outlet 58. In this position of lever 66, valve 54 allows air to travel from line 52' to line 64 which connects through solenoid valve 90 to line 94 as previously explained. Line 94 connects to a second proportioning valve 100 which connects to an outlet line 102 leading to mechanism 33 which is located opposite mechanism 32 adjacent the same suspension part. Air line 96" also connects to valve 100 to deliver air under pressure directly from supply 30 to valve 100. Air delivered through line 94 from valve 54 operates to open valve 100 to deliver air under pressure from line 96" to line 102 thereby actuating mechanism 33. Referring back to FIG. 5, actuation of mechanism 33, and thus also mechanism 39 on the right side of vehicle 10, applies a force against the rear ends of springs $S_1$ and $S_4$ in accordance with the directional arrows of mechanisms 33 and 39, thereby causing springs $S_1$ and $S_4$ and thus also associated axle 14 to pivot in the clockwise direction which is opposite to the direction of the turn.

As previously discussed, the axle-pivoting mechanisms 34–37 which are located to act indirectly on the middle and back rear axles 16 and 18, respectively, are needed and thus actuated only during reverse travel. More particularly, reverse switch 104 seen in FIGS. 6A and 6B is the already existing reverse switch for activating the vehicle's back-up lights (not shown), with the switch being mounted through the vehicle's transmission housing 106 in adjacent relationship to the transmission reverse gear 108. An electric wire 110 supplies electricity to switch 104 from battery 44 via ignition 40, with switch 104 including a first lead 112 connecting to the back-up lights in the known manner. A second lead 114 connects to wire 50 of the automatic control system of FIG. 6A, and a third lead 116 energizes the axle-pivoting mechanisms on axles 16 and 18 in the manner described below.

Thus, when the vehicle is shifted into reverse, gear 108 is pushed against the plunger element 105 of switch 104 thereby closing switch 104 to provide current through leads 112, 114 and 116. Referring now solely to FIG. 6A, it is seen that lead 114 connects to a diode 118 before connecting to wire 50 at the left terminal of switch 38, with diode 118 being arranged so as to permit current to travel in only one direction through lead 114, namely, from switch 104 to wire 50. Thus, assuming switch 38 is closed when the vehicle is travelling forward (which means reverse switch 104 is open), current is prohibited from travelling through lead 114 by diode 118, however, when reverse switch 104 is closed, current travels through both leads 114 and 116.

Since lead 114 connects to wire 50 through diode 118, it is seen that solenoid 48 is energized also during reverse operation of the vehicle which allows air under pressure to travel from source 30 to proportioning valve 54 via air lines 52 and 52' as it does during forward travel. Additionally, however, the closing of switch 104 also provides current through lead 116 which energizes cross-over solenoid 90, in addition to solenoids 120, 122 and 124. With solenoid 90 energized, air lines 62 and 64 leading from proportioning valve 54 are now connected to air lines 94 and 92, respectively, as previously explained. As such, when the vehicle is turned to the right during reverse operation of the vehicle, axle-pivoting mechanism 33 (and also mechanism 36) is actuated instead of mechanism 32 (and 37). As such, axle 14 will pivot in the opposite direction as it pivots when travelling in a forwardly direction. That is, when in reverse, axle 14 will be caused to pivot in the same direction as the wheel is turned. This is desirable since in reverse, the wheel is turned in the direction opposite to the direction of vehicle travel. As such, the rear axle must be pivoted in the same direction as the front wheels are turned so that the rear of the vehicle will track around the corner being negotiated.

In a vehicle with three rear axles, however, (such as vehicle 10 in FIGS. 1–4) it is preferred that the center rear axle 16 be maintained in its normally biased perpendicular position with respect to the vehicle's longitudinal centerline. This is so that the center rear axle 16 acts as a second, dynamic pivot axis about which the first and third rear axles 14 and 18, respectively, may pivot during turning as will be understood below. In the automatic control system of FIG. 6A, this is achieved by the energizing of solenoid 120 which allows air to travel through line 126 which opens valve 128 which, in turn, allows full air pressure to travel through valve 128 from air line 130 to air line 132 which connects to both mechanisms 34 and 35.

Third rear axle 18 is caused to pivot in the opposite direction as first rear axle 14 during reverse travel since the wheels of the third rear axle are, in essence, the steering wheels when traveling in reverse and are thus directed to track around the corner being negotiated. In particular, energizing of solenoids 122 and 124 is simultaneous upon closing reverse switch 104, however, air is traveling through only one of the lines 92 or 94 at any one time depending on whether a right or left turn is being negotiated as previously explained. Full air pressure is provided to proportioning valves 134 and 136 through air line 96 so that when both solenoid valves 122 and 124 are energized and thus open, air under pressure is provided to either mechanism 37 or 36 in an amount directly proportional to the amount of air traveling through lines 92 and 94 depending on whether the steering has been turned to either the right or left, respectively. It may thus be realized that the actuation of mechanisms 37 and 36 are substantially synchronous with the actuation of mechanisms 32 and 33, respectively, during reverse travel of the vehicle. Thus, as seen in FIG. 7, vehicle 10, which has been shifted into reverse, is attempting to back up to a dock between two other vehicles 11 and 13. Turning the front wheels 22 clockwise causes first rear axle 14 to pivot clockwise also while center rear axle 16 remains stationary and third rear axle 18 pivots counter-clockwise in accordance with the automatic control system described herein. As such, the rear wheels track smoothly around vehicle 13 without the driver having to make any extraordinary steering judgements.

As mentioned previously, the axle-pivoting mechanisms 32–43 may take a variety of forms, and different types of mechanisms may be present on the same vehicle and are freely interchangeable with each other as the user's likes and needs dictate. Furthermore, the user has several options regarding the particular positioning of each of the axle-pivoting mechanisms. For example, as seen in the partial plan view of first rear axle 14 in FIG. 8A, axle-pivoting mechanisms 33 and 38 are seen to comprise air brake cylinder and piston assemblies which are mounted through the frame members F1 and F2, and through the inwardly facing walls of the frame "sidemounted" rear spring hangers 138 and 140, respectively, which are wider than conventional spring hangers to permit lateral deflection of the respective spring ends S1 and S4 positioned therein. As seen, the mechanisms 33 and 38 are mounted to the spring hangers 138 and 140 with the piston elements thereof extending through an aperture formed in the hanger wall, and into the center opening of the hanger with the respective push plates 33' and 38' thereof positioned adjacent the inwardly facing side edges of the springs $S_1$ and $S_4$, respectively.

Alternative, bellows-type of pneumatic mechanisms are provided at the positions identified by numerals 32 and 39, and are seen to be positioned entirely within the spaces between springs $S_1$ and $S_4$ and their respective spring hangers 138 and 140, opposite to mechanisms 33 and 38, respectively. FIG. 8B is a rear, elevational view showing mounting of the pneumatic mechanisms with alternative, "under-frame" spring hangers.

A more detailed showing of the uniquely configured bellows-type of pneumatic mechanism may be seen in FIGS. 9A–9E. More particularly, a bellows-type pneumatic mechanism 142 of square cross-section is seen in FIG. 9A which includes two rigid end plates 144 and 146 which are connected together to lie in spaced, parallel planes by a flexible web 148 of an air-tight, durable material (e.g., the same rubberized material from which conventional heavy-duty suspension air bags are constructed). Web 148 is fixedly sealed to and extends between the full perimeters of plates 144 and 146 such that plates 144 and 146 are freely movable both towards and away from each other. A third rigid plate 150 is fixedly attached to the inner surface of either one of the two plates to limit the distance between the two end plates during compression for reasons explained below. An inlet/outlet port 154 is provided through the web 148 to attach to the air supply lines which lead directly into the axle-pivoting mechanisms 32–37 in the system of FIG. 6A.

A second, rectangular configuration of the bellows-type pneumatic mechanism is seen in FIG. 9B as numeral 156 which includes rectangular end plates 158 and 160, an interconnecting web 162, a third, rigid, interiorly positioned limit plate 161, and an inlet/outlet port 166 extending through the center of end plate 160.

The manner of mounting the mechanisms of FIGS. 9A and 9B within a widened spring hanger 169 may be seen in FIG. 9D wherein the mechanisms 142 and 156 are positioned on opposite sides of spring end $S_1$ in the positions of the mechanisms 32 and 33 in FIG. 5, respectively, with the end plates 144 and 158 thereof abutted against the spring end S1, and the opposite end plates 146 and 160 thereof abutted against the outer hanger walls 169' and 169", respectively It will be noticed inlet/outlet stem 166 passes through an aperture formed in hanger wall 169"0 for connection to an air line while the inlet/outlet stem 154 of mechanism 142 is accessible from the open end of the spring hanger. It is again noted that the different mechanism designs are interchangeable with one another, and that the design chosen depends on the needs and likes of the user.

The mechanisms 142 and 156 are shown in their normal, at rest position of approximately midway between their fully expanded and fully compressed positions. Particularly, when air under pressure is forced through inlet stems 154 or 166, the end plates are pushed away from each other with expansion of webs 148 and 162, respectively. If only mechanism 142 is being activated, plate 144 is brought to bear against spring end $S_1$ to push it laterally against plate 158 of mechanism 156, which will thereby compress mechanism 156 until plate 158 hits limit plate 161 and plate 160 abuts against hanger wall 169". In this way, limit plate 161 acts to limit the lateral deflection of spring end $S_1$ caused by activation and expansion of mechanism 142. Likewise, limit plate 150 acts to limit the lateral deflection of spring $S_1$ in the opposite direction upon activation and expansion of only mechanism 156. This is desirable since only limited lateral movement of the spring end is needed to pivot the associated axle.

A third, circular configuration of the bellows-type pneumatic mechanism is seen in FIG. 9C as numeral 168 which includes circular end plates 170 and 172, an interconnecting web 174, a third, rigid, interiorly positioned limit plate 176, and an inlet/outlet port 178 extending through the center of end plate 172. A threaded shaft 180 is fixedly secured to and perpendicularly extends from opposite end plate 170, and onto which a bearing plate 182 may be threadedly attached in spaced, parallel relationship to end plates 170 and 172. In this embodiment, the mechanism is mounted to the inner facing wall of the spring hanger in a manner similar to the air brake mechanism such as 33 and 38 seen in FIGS. 8A and 8B, where the shaft 180 of mechanism 168 would extend through the wall of the spring hanger with the bearing plate 182 being located in the space between the spring and the hanger wall. It is preferred that this embodiment of the mechanism seen in FIG. 9C be removably encased within a protective housing structure such as that seen in FIG. 9E and designated by reference numeral 183. A housing 184 includes a circular cavity 186 with a removable cover plate 188 having a circular, centrally located aperture 190 formed therethrough. A neck portion 192 and circular plate 194 are integrally attached to the housing opposite and in a plane spaced and parallel to cover plate 188, neck portion 192 and plate 194 being provided with a centrally located bore hole 196 which communicates with cavity 186 and wherethrough shaft 180 extends upon positioning mechanism 168 inside housing 184.

Plate 194 further includes a plurality of annularly spaced screw holes 195 extending about the periphery thereof and through which screws are passed to mount the housing structure to an exterior surface of the hanger wall such as seen in FIG. 9F, with shafts 180 extending through the hanger wall and bearing plates 182 positioned in abutting relationship to the end of the spring S.

Referring again to FIG. 8A, it is seen that the forward ends of springs $S_1$ and $S_4$ may also be equipped with axle-pivoting mechanisms 200, 202 and 204, 206, respectively, which may be used in addition to the mechanisms on the rear ends of the springs to provide additional leveraging force, or separately to provide the needed force to pivot the axle simply from the front of the springs instead of the rear. If used together with the mechanisms at the rear of the springs, the mechanisms on the opposite ends and opposite sides of the respective spring would activate simultaneously, (i.e., mechanisms 33 and 200 on spring $S_1$, and mechanisms 39 and 204 on spring $S_4$ would all activate simultaneously during a left hand turn of the vehicle in forward travel to pivot axle 14 to the right, and mechanisms 32, 202 and 38, 206 would activate simultaneously during a right hand turn in forward travel to pivot axle 14 to the left).

Also, although not recommended due to the necessity of greater leveraging force, the front mechanisms may be used alone (i.e., without any mechanisms at the rear of the springs), whereby mechanisms 200 and 204 would be activated simultaneously during a left-hand turn to pivot the axle right, and mechanisms 202 and 206 would be activated simultaneously during a right-hand turn to pivot the axle to the left.

FIGS. 10A–D show a preferred positioning of the bellows-type pneumatic mechanisms on a suspension system employing air bags 600 shown with respect to a single axle 14. FIG. 10A shows a four-bag per axle suspension system with torsion rods 602 and 604 angled inwardly from the axle to the stabilizer bar 610, while FIG. 10C shows a two-bag per axle suspension system with torsion rods 606 and 608 angled inwardly from the bags 600 to the stabilizer bar 610. In both configurations, a rigid T-shaped bar 612 (FIG. 10B) attaches between the frame members $F_1$ and $F_2$ and extends downwardly between the two laterally adjacent pair of air bags 600 to provide a stable wall member 612' against which the axle-pivoting mechanisms 33 and 38 are mounted. The bottom support 601 of each air bag 600 (which is movable independently of upper support 603 which mounts to the frame) is provided with an upwardly extending wall member 601' against which mechanisms 33 and 38 act when actuated to move the bottom support 601 of its respective air bag 600. The bottom support 601 of each air bag ultimately connects to its associated axle via torsion rod 602, 604 and 606, 608 in the two and four bag configurations of FIGS. 10A and 10C, respectively° In this way, movement of bottom support 601 causes a corresponding movement of its associated axle. As seen in FIGS. 10C and D, in the four-bag configuration, the torsion rods are attached at their approximate midportions to the axle 14 with a rotatable bearing 613 which is provided to accommodate the movement of the axle 14 with respect to the torsion rod 606, 608 upon movement of the bottom support 601 of air bag 600 via the axle-pivoting mechanism.

Figure 11B:
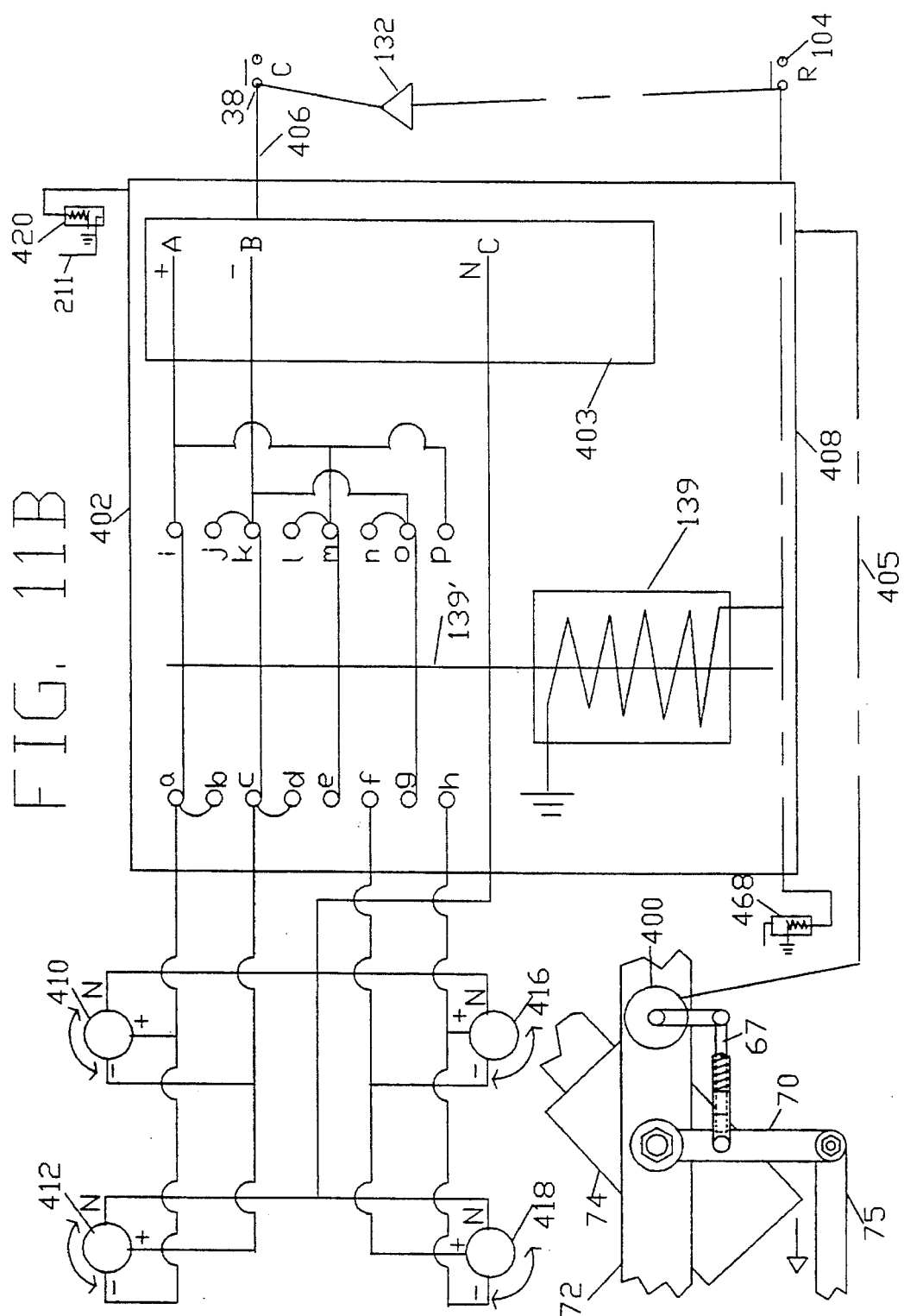
FIG. 11B is an enlarged electrical schematic detail of the stepper motor controller of FIG. 11A.

Attention is now turned to FIGS. 11A and 11B which show another type of electro-pneumatic automatic control system which employs a plurality of stepper motors to actuate and control the pneumatic cylinders. Although the steering components and certain other elements shown are the same as those of FIG. 6A, the steering sensor in this embodiment may take the form of a potentiometer 400 which is mounted to the vehicle's frame 72, and is rotated by movement of linkage 66, one end of which is fixedly attached to the potentiometer rotor. Thus, potentiometer 400 may be turned to either the right or left depending on whether pitman arm 70 is being turned to the right or left, respectively. Potentiometer 400 is electrically connected via line 405 to a stepper motor controller 402 which itself is electrically connected to the vehicle's ignition and battery 40 and 44, respectively, via electric leads 406 and 42 through switch 38 for forward control, and via electric leads 408 and 110 through reverse switch 104 for reverse travel. As with the design of the embodiment of FIG. 6A, switches 38 and 104 are interconnected through diode 118 such that current will travel through wire 406 during reverse travel even if switch 38 is open.

Stepper motor controller 402 (whose electrical configuration is seen and will be discussed more fully with respect to FIG. 11B), connects to a plurality of stepper motors 410, 412, 416 and 418 which operate and control a respective plurality of pneumatic mechanisms 456, 458, 460 and 462 which are positioned in pairs on opposite sides of a suspension part such as the positions indicated at 32, 33, 37 and 36 in FIG. 5, respectively. The other two pneumatic mechanisms 464 and 466 seen in FIG. 11A are positioned in the positions indicated at 34 and 35, respectively, of FIG. 5 for controlling the center axle during reverse travel as will be discussed more fully below. Although not shown for the sake of clarity, it is understood that identical lines and mechanisms may be run from the potentiometer 400 and the switches 38 and 104 for acting on the right side of the vehicle, as indicated in FIG. 5 at positions 38–43, and for as many axles as are needed.

It will be noticed in FIG. 11A that air supply 30 is directly connected to proportioning valves 432,434,436, and 438 in series via air line 424 to provide full air pressure to the proportioning valves at all times. A second air line 422 connects to a normally closed solenoid valve 420 which is connected to controller 402 and energized in response to closing of either switch 38 or 104. Air line 422 continues through solenoid valve 420 to a second set of proportioning valves 424, 426, 428 and 430 which are connected to and actuated by a respective set of stepper motors 410, 412, 416 and 418 which in turn are electrically connected to and controlled by controller 402 via electric lines 410', 412', 416', and 418', respectively. Each motor includes a respective arm 410", 412", 416", and 418" which attaches to a respective lever extending from each proportioning valve 424, 426, 428 and 430 whereby movement of a stepper motor arm acts to move the attached lever of the respective proportioning valve by exactly the same amount.

FIG. 11B is an enlarged, more detailed electrical schematic of the stepper motor controller 402 including the electrical connections between potentiometer 400 and stepper motors 410, 412, 416 and 418. Controller 402 is seen to comprise a terminal block 403 having contacts A, B and C for respective connection to the wires of three-wire cable 405. A solenoid relay switch 139, which is controlled by the automatic reverse switch 104 via line 408, has movable armature 139' which controls the position of the contact arms connecting pairs of relay contacts, and thus the connections between the contacts A, B and C of terminal block 403 and the terminals of stepper motors 410, 412, 416 and 418.

More particularly, stepper motors 410 and 412 are reverse wired with respect to one another, as are stepper motors 416 and 418, such that a voltage applied from controller 402 will actuate both of the motors of a pair, one in a clockwise direction and the other in a counter-clockwise direction. Since the stepper motor will actuate its respective proportioning valve only when moved in the clockwise direction, only one of each pair of pneumatic mechanisms 456, 458 and 460, 462 will be actuated at any given time.

The magnitude and polarity of the voltage is controlled by the steering through potentiometer 400. That is, when making right and left turns the polarity will be positive and negative, respectively, and will have a magnitude dependent upon the magnitude or degree of the turn. During forward operation of the vehicle, solenoid armature 139' is positioned as shown in FIG. 11B and the relay contacts are connected or disconnected accordingly. Positive terminal A of terminal block 403 is connected to the positive and negative sides of stepper motors 410 and 412, respectively, through relay contacts A and I, and negative terminal B is connected to the opposite sides of these stepper motors through relay contacts C and K. During reverse operation, solenoid 139 is actuated to move armature 139' and the switch arms to the alternate position, thereby operating the opposite ones of stepper motors 410 and 412 for right and left turns during reverse travel than for forward travel. This is so since in reverse, armature 139' connects positive terminal A to the positive terminal of motor 412 and the negative terminal of motor 410 through relay contacts L and D, while also connecting terminal B to the opposite terminals of these motors through relay contacts B and J. Additionally, terminal A is connected through relay contacts P and H to the positive and negative sides, respectively, of stepper motors 416 and 418 while terminal B is connected through contacts F and N to the opposite sides of these stepper motors.

Referring back to FIG. 11A, during forward travel, solenoid 139 of controller 402 disconnects stepper motors 416, 418 and normally closed solenoid 468 is closed such that the pneumatic mechanisms 460, 462 and 464, 466 controlling the back and middle axles 18 and 16, respectively, are de-actuated. As such, only their respective torsion rods 16' and 18' control the self-tracking movement of these axles during forward travel as with the system of FIG. 6A. Since controller 402 activates stepper motors 410 and 412 during forward travel, mechanisms 456 and 458 are actuated to control the front rear axle 14 during forward travel. If the vehicle is turned right, potentiometer 400 is rotated in the clockwise direction generating a positive voltage at terminal A thereby actuating stepper motor 410 which opens proportioning valve 424 to a degree commensurate with the magnitude of the voltage (which is commensurate with the degree of the turn as previously explained). Opening of valve 424 opens second proportioning valve 432 to allow air under pressure from line 424 to line 448 which actuates mechanism 456. As previously mentioned, mechanism 456 is at position 32 in FIG. 5 causing axle 14 to pivot in the opposite direction to which the vehicle is being turned. Likewise, if the vehicle is turned lefts potentiometer 400 is rotated in the counter-clockwise direction generating a negative voltage at terminal B thereby actuating stepper motor 412 which opens proportioning valve 426 which, in turn, opens second proportioning valve 434 to allow air under pressure to travel from line 424 to line 450 which actuates mechanism 458 (position 33 in FIG. 5), thereby pivoting axle 14 in the opposite direction. As described with regard to FIG. 11B, the opposite stepper motors are actuated in reverse so that the axle 14 is caused to pivot in the same direction the steering is turned when in reverse. Also, during reverse, the stepper motors 416 and 418 at the back axle 18 operate oppositely with respect to motors 410 and 412 such that the back axle 18 pivots in the opposite direction that front axle 14 pivots. Furthermore, closing of reverse switch 104 energizes solenoid 468 to actuate mechanisms 466 and 464 which are located at positions 34 and 35 to maintain the center axle 16 straight during reverse travel.

It is noted that the electric configuration of controller 402 is rather simplistic and outdated, yet lends itself well to ease of describing the operation of the system of FIG. 11A. It is understood that controller 402 could be easily replaced with state-of-the-art electronics to accomplish the same function.

As seen in FIGS. 12 and 13, an ultra-sonic detector 85 or magnetic sensor 82 may be used, respectively, instead of potentiometer 400 in the system of FIG. 11A. The magnetic sensor 82 is especially useful for use with a control system for the pivoting action of the rear axles of a trailer 84 wherein the tail of the fifth wheel 86 of the tractor 88 pivots with respect to the tractor 88 in response to the vehicle turning. The magnetic sensor 82 comprises a plurality of magnetic switches 83 which are placed in a linear fashion above and across the opposite fins 86' of the fifth wheel 86 such that movement of a fin in one direction causes the switches to be sequentially activated in one direction, and movement of the opposite fin in the other direction causes the switches to be sequentially activated in another direction. Magnetic sensor 82 can thus operate to provide two signals of opposite polarity and magnitude to the electric controller 402 depending on the direction the vehicle is turning to in a manner similar to potentiometer 400. The operation of the ultra-sonic sensor 85 is similar to the type of sensor used in automatic camera focusing which is operable to sense the distance of an object as it approaches and then moves away from the sensor. This sensor may be attached to the frame 72 adjacent the pitman arm 70 of the steering box 74 as shown in FIG. 12.

Discussion is turned to the embodiment of FIG. 14A which illustrates a hydraulically operated control system which is specifically designed for heavy duty vehicles having multiple steering axles such as vehicle 500 seen in FIGS. 15A and 15B, although it may be used on any vehicle in the same manner as the systems of FIGS. 6A and 11A. Vehicle 500 includes six axles 501–506 with the center two axles 503 and 504 being full-floating, driven axles each having double wheel pairs, and each center axle being further equipped with inwardly angled torsion rods 503' and 504' and widened spring hangers (not shown in FIG. 15A) in accordance with my previous invention mentioned above making axles 503 and 504 self-tracking during forward travel. The remaining front two axles 501 and 502 and back two axles 505 and 506 are solid axles having single steering tires at each end of each axle which are steerable via separate king pin steering assemblies known in the art. The presence of driving axles in the center of a vehicle having steering axles in both the front and rear causes a great deal of maneuvering difficulty which the system of FIGS. 14A–16C remedies. In a vehicle of this type, it has been determined that assisted, synchronized steering of the steering wheels in both forward and reverse travel, in combination with self tracking of the center driving axles in forward, and powered pivoting of the center driving axles in reverse, is optimal at reducing the skid and wear of the tires that usually occurs in this type of vehicle during forward and reverse cornering. It is thus noted that while the systems described thus far have related solely to powered pivoting of the rear axles, the system of FIGS. 14–16 provides powered, synchronized steering of the steering wheels, in addition to powered pivoting of the center driving axles during reverse travel.

More particularly, the steering control system of FIG. 14A employs a plurality of specialized hydraulic rams 508-513 which are hydraulically interconnected in the manner described below with rams 508, 509, 511 and 512 taking the place of the conventional hydraulic mechanisms presently used in the steering linkages of the steering axles of this vehicle type, while rams 510 and 513 are positioned adjacent preselected suspension parts of the center, driven axles 503,504 to assist the pivoting thereof during reverse travel only. As mentioned above, center axles 503 and 504 self-track in the forward direction and therefore receive no powered pivoting assistance from the system of FIG. 14A during forward travel as will be described more particularly below.

In FIG. 14A, rams 508 and 511 would be fitted to the steering linkages of each wheel of first axle 501, respectively, rams 509 and 512 would be fitted to the steering linkages of each wheel of second axle 502, respectively, and rams 510 and 513 would be fitted adjacent preselected suspension parts of the first center axle 503. The rams for the steering linkages of the back three axles 504, 505 and 506 have not been shown in FIG. 14A for the sake of clarity, but the hydraulic lines which would operate them are shown as lines 520 and 522 extending from valve 524, with the remaining hydraulic connections between the additional set of six rams being identical to the connections between the six rams 508–513 in FIG. 14A described below.

Hydraulic fluid is delivered from supply 526 to pump 528 via line 530 which, in turn, delivers fluid under pressure to the vehicle's steering gear box 532 via line 534, gear box 532 having a pitman arm 536 rotatably depending therefrom in the usual manner of steering linkage construction of this type. A second hydraulic line 538 is attached to gear box 532 and delivers hydraulic fluid under pressure to first and second, dual outlet proportioning valves 540 and 524, respectively, with the operating levers 540' and 524' of each being pivotally connected to opposite ends of an arm 542 which itself is pivotally connected at the center thereof to the lower end of pitman arm 536 opposite gear box 532. Thus, as pitman arm 536 is moved to the front or rear about its pivotal connection to gear box 532 in response to the steering wheel being rotated to the right or left, respectively, valve levers 540' and 524' are also moved to the front or rear, respectively.

Valves 540 and 524 are proportioning valves each having single inlet ports and triple outlet ports. Fluid under pressure is delivered via line 538 in a sequential manner to both valves 540 and 524, with hydraulic lines 520 and 522 being connected to the dual outlets of valve 524, and hydraulic lines 544 and 546 being connected to the dual outlets of valve 540, respectively. As mentioned above, valve 524 and corresponding lines 520 and 522 would lead to and operate a hydraulic system substantially identical to the system described hereinbelow to which valve 540 and corresponding lines 544 and 546 lead to and operate, with the system of valve 524 controlling the last three axles of vehicle 500 while valve 540 controls the front three axles, respectively.

To continue then, it is seen that a second fluid reservoir 548 is provided which is used to both prime and bleed the hydraulic rams 508–513, with reservoir 548 having an inlet or accumulator line 550 leading from valves 540 and 524. Line 550 also connects to the main hydraulic supply 526 via branch line 552 having a restrictor valve 554 thereon which allows only a small percentage (e.g., 1%) of the fluid travelling from valves 540 and 524 through line 550 to reservoir 548, with the majority of the fluid being routed back to supply 526. A main return line 556 extends between auxiliary and main reservoirs 548 and 526, respectively, with the true orientation of the hydraulic lines attached to auxiliary reservoir 548 seen in FIG. 14C. Specifically, the inlet line 550 enters at the bottom of reservoir 548 while the return line 556 exits from the top of reservoir 548 which assists in bleeding the air from the top of the second reservoir 548 as it is being filled through line 550.

As mentioned previously, the hydraulic rams of the system of FIG. 14A are hydraulically interconnected which allows for the critical synchronization between the rams needed for the smooth steering of each wheel of vehicle 500 through a turn that the system of FIG. 14A achieves. This unique, hydraulic intercoupling of the rams is made possible with the unique configuration of the rams themselves, each of which are identical with a representative one seen best in FIG. 14D. Particularly, rams 508–513 are comprised of a cylinder 557 having a piston plate and rod assembly 558 and 560, respectively, positioned for reciprocating movement within cylinder 557. It may thus be realized that piston plate 558 effectively divides cylinder 557 into first and second discrete fluid chambers 564 and 566, respectively, each of which are provided with their own combined inlet/outlet ports 564' and 566', respectively.

A push plate 568 may be attached in perpendicular relationship to the terminal end of rod 560 (only if the ram is used for acting on a suspension part, as with the rams of the center axles 503 and 504), with the rams 508–513 being mounted on the vehicle with rod 560 positioned adjacent the steering linkage (or suspension part with regard to the center axles 503 and 504) which will be described in detail below with regard to FIGS. 14A–G and 16A–C.

As seen in FIG. 14A, line 546 branches into a first branch line 571 which attaches to the port 564' of the first chamber 564 of the first mechanism 508, while the port 566' of the second chamber of first mechanism 508 is connected to the port 564' of the first chamber of the second mechanism 509 via hydraulic line 572, and the second chamber 566' of second mechanism 509 is connected to the first chamber 564' of third mechanism 510 via hydraulic line 574. A three-way valve 577 is attached to the port 566' of the second chamber of the last mechanism 510 in the series with hydraulic lines 576 and 601 connecting thereto, respectively, and leading to the second reservoir 548 and the "left-hand turn" line 544 of valve 540, respectively.

During initial priming of the cylinders, the second chamber 566 of last mechanism 510 is filled via line 576 from second reservoir 548 during a retracting stroke of the piston assembly contained therein, or from line 601 when an opposite turn is executed. During a compression stroke thereof (which is caused by a right turn of the vehicle via fluid travelling through line 546), fluid contained in the second chamber 566 of last mechanism 510 is dumped back into second reservoir 548 via line 576, and also into line 581 which returns to valve 540 via line 544. Furthermore, during a left-hand turn of the vehicle, fluid travels from line 544 back through line 581 and into the second chamber 566 of last mechanism 510 which causes the mechanisms 510, 509 and 508 to return to their retracted positions.

Each of the other hydraulic lines 571, 572 and 574 leading to and from mechanisms 508, 509 and 510, respectively, also include bleeder lines having respective bleeder valves 578, each of which intersect with line 576 to a common bleeder line 580 which connects to second fluid reservoir 548 (see also FIG. 14C).

Mechanisms 508, 509 and 510 are actuated simultaneously during a right-hand turn of the vehicle due to hydraulic fluid being delivered through line 546 by valve 540, with mechanisms 511, 512 and 513 being simultaneously deactivated (or retracted) by virtue of fluid travelling through line 592 which branches from line 546, as will be set forth more fully below. Likewise, mechanisms 511, 512 and 513 are actuated simultaneously during a left-hand turn of the vehicle due to hydraulic fluid being delivered through line 544 from valve 540, with mechanisms 508, 509 and 510 being simultaneously deactivated by virtue of fluid travelling through line 601 from line 544. In this regard, it is noted that the hydraulic connections between mechanisms 511–513 and second reservoir 548 are identical to the hydraulic connections between mechanisms 508–510 and second reservoir 548. Particularly, line 544 branches at line 582 to connect to the port 564' of the first chamber 564 of the first mechanism in the series 511; the second port 566' of first mechanism 511 connects to the first port 564' of second mechanism 512 via line 584; the second port 566' of second mechanism 512 connects to the first port 564' of the third mechanism 513 via line 586; and the second port 566' of third and last mechanism 513 connects to the second reservoir 548 via line 588. Also, each of the lines 582, 584, 586 and 588 include a bleeder line and respective bleeder valve 578, each of which intersect with a common bleeder line 590 which leads and connects to second reservoir 548.

To initially prime the system, the driver starts the vehicle's engine which actuates pump 528 and delivers fluid through line 534 and gear box 532 to line 538 and valves 540 and 524. With the operating levers of valves 540 and 524 in the neutral, straight positions shown, the fluid in line 538 continues straight through the valves to accumulator line 550 which fills second reservoir 548 as previously mentioned. Thus, fluid travelling through accumulator line 550 effectively fills second reservoir 548 to capacity. Further, with bleeder valves 578 all opened, the driver turns the steering wheel alternately to the right and left which delivers fluid alternately through lines 546 and 544, respectively, which acts to fill the first chambers of each of the first mechanisms 508 and 511 while air therein is allowed to escape via lines 593 and 595 to second reservoir 548. Furthermore, the resulting reciprocating movement of the piston assemblies in each of the first mechanisms 508 and 511 causes fluid to travel from reservoir 548 through each of the bleeder lines to sequentially fill the remaining chambers of each mechanism 508–513 until each mechanism achieves equilibrium, at which time the bleeder valves 578 are closed.

The basic operation of the system through a forward, righthand turn of the vehicle is as follows. Pump 528 supplies fluid under pressure to valves 540 and 524 via line 538 and levers 540' and 524' are pushed to the right by steering arm 536 upon the driver turning the steering wheel to the right. Fluid under pressure is thus caused to travel through lines 546 and 520 in an amount directly proportional to the degree of vehicle turning. Fluid travels through line 546 (as previously mentioned, the remainder of the system to which lines 520 and 522 lead are not shown herein) and branches into three lines 571, 573 and 592 leading to the inlet/outlet port 564' of the first chamber of the first mechanism 508, the port 566' of the last mechanism in the "left-turn" series 513, and to a normally closed solenoid valve 597, respectively. Line 592 is seen to continue past solenoid 597 to connect to mechanism 510 which is positioned adjacent the center axle 503 in vehicle 500 (as is mechanism 513), and whose operation will be discussed later with regard to reverse travel of vehicle 500.

Thus, upon a right-hand, forward turn, fluid travels from line 571 to the first chamber 564 of first mechanism 508 which causes piston plate 558 positioned therein to move toward second chamber 566 thereby extending rod 560 while simultaneously displacing the fluid in second chamber 566 by an amount very nearly 50% to the amount of fluid entering first chamber 564 due to the area which is occupied by rod 560 in second chamber 566.

The fluid displaced from second chamber 566 of the first mechanism 508 is forced into the first chamber 564 of the second mechanism 509 via line 572. Since the mechanisms are of identical construction and the amount of fluid displacement from the second chamber of the first mechanism (and thus also the amount of fluid entering the first chamber of second mechanism 510) is approximately half to the amount of fluid injected into the first chamber of the mechanism 508 as mentioned above, the push plate 558 of second mechanism 509 moves approximately half the amount as the push plate of first mechanism 508 was caused to move. Consequently, the amount of rod extension for the second mechanism 510 is half that of first mechanism 508. This holds true for every mechanism in the series; that is to say, each sequentially successive mechanism is approximately half the power of the mechanism immediately prior. This is desirable since the degree the wheels are caused to turn through a turn should be greater at the front of the vehicle than at the back of the vehicle. To obtain this optimal 50% differential between the successive mechanisms, it has been determined that a cylinder with a bore size of 4 inches and a piston having a 2.8285 inch diameter is preferable. Thus, the fluid injected into the first chamber 564 of second mechanism 509 causes fluid displacement from second chamber 566 thereof which travels to the first chamber 564 of the next mechanism 510 via line 574, which in turn causes the piston plate therein to move towards second chamber 566 thereof which dumps its fluid into second reservoir 548 via line 576.

The action between the mechanisms is virtually spontaneous such that there is no noticeable lag between reaction times on the various mechanisms during cornering. Furthermore, while mechanisms 508–510 are actuated as described above, mechanisms 511–513 are simultaneously deactivated by fluid traveling through line 592 into the last chamber 566 of mechanism 513 which retracts rod 560 thereof setting up a chain reaction amongst the mechanisms 511 and 512.

When the steering wheel is turned back in the opposite direction (left), lever 540' is moved by arm 542 to bleed line 546 ultimately back to reservoir 526 and pump 528 via accumulator and return lines 550 and 552, respectively. With the pressure thus relieved from the first chamber 564 of first mechanism 508, fluid bleeds back through line 571 to allow piston plate 558 to move back toward first chamber 564 thereof which retracts push plate 568 and sets up a veritable chain reaction amongst the additional mechanisms 510 and 512 which are placed in series with the first mechanism 508. More particularly, fluid flow occurs from the first chamber of mechanism 509 to the second chamber of mechanism 508 biasing the piston plate in mechanism 509 toward the first chamber thereof and retracting its push plate; fluid further flowing from the first chamber of mechanism 510 to the second chamber of mechanism 509 via line 574; and fluid further flowing from line 601 to the second chamber of mechanism 510 (upon turning the steering to the left) which thereby also retracts the push plate of mechanism 510.

During the above-listed operations in the forward direction, cylinders 510 and 513 are on the self-tracking axles and are not in position to act on the axles even though they are powered hydraulically. However, when the vehicle is shifted into reverse, power is applied automatically through ignition switch 82 and lead 81 to the automatic reverse switch 104 on the transmission, through electric line 598 to solenoid 590 and line 600 to solenoid 597, respectively. Solenoid 590 closes the normally open line (NO) and opens the normally closed line (NC) to allow positive pressure through check valve 603 to piston 614 which extends to move mechanism 513 to an operating position closely adjacent its respective suspension part such that it can control the front third axle 503 to pivot in reverse. Also, as just explained, solenoid 597 opens allowing full pressure to check valve 605 to activate mechanism 612 which moves mechanism 510 for the opposite side of the axle. Mechanisms 612 and 614 will remain in this position as long as the transmission is in reverse. Upon shifting to any forward gear, switch 104 opens and solenoids 590 and 592 are deactivated so that they no longer supply pressure to rams 612 and 614. At this time, the associated center axles 503 and 504 self track in forward and the movement of the axle 503, 504 pushes associated cylinders 510 and 513 back to a position of no use, i.e., clear of the suspension part. This is more clearly seen in FIGS. 14E–G wherein FIG. 14E shows the standard hydraulic mechanism 510 and 513 used in the system of FIG. 14A mounted so as to be longitudinally slidable in bracket 622. FIG. 14F shows an end and side view of the bracket 622 which also includes a curved center cover plate 624 removably secured curved via bolts 626, to opposite curved side walls 622' extending upwardly from the center of bracket 622.

As seen in FIGS. 14E and G, mechanisms 510 and 513 are provided with a vertically extending fin 628 extending substantially coplanar to inlet/outlet ports 564' and 566' thereof. Also, the end walls 623 and 625 of bracket 622 each include a vertically extending slot 627 wherethrough fin 628 and rod 560 extend as mechanism 510, 513 slide within bracket 622 in the manner described below.

More particularly, as seen in FIG. 14G, bracket 622 is mounted to the side of the vehicle's frame $F_1$ opposite to the spring $S_1$ of the associated axle 503,504 of mechanism 510, 513. A hole 630 is drilled through the frame $F_1$ wherethrough the rod 560 of mechanism 510, 513 extends, with the push plate 568 thereof lying on the opposite side of frame $F_1$, laterally adjacent the end of the spring $S_1$. The mechanism 612, 614 (see also FIG. 14A) is mounted to the side of an auxiliary frame member F' and extends toward mechanism 510, 513 as shown in FIG. 14G. A clevis and pin 630 attaches to the fin 628 of mechanism 510, 513 whereby actuation of mechanism 612, 614 via check valve 605, 603 pushes mechanism 510, 513 from the position seen in FIG. 14G, toward spring $S_1$ within bracket 622 whereupon push plate 568 assumes a position closely adjacent spring $S_1$ (this position not shown) such that actuation of mechanism 510, 513 via hydraulic line 574, 586, respectively, causes extension of rod 560 and push plate 568 which applies a force against spring $S_1$. Mechanisms 510 and 513 placed on opposite sides of the spring $S_1$, such as seen at positions 34 and 35 of FIG. 5, respectively, and since mechanisms 510 and 513 are actuated via air pressure through lines 573 and 583 depending on whether the vehicle is turned to the right or left, respectively, and this during reverse travel only as explained with reference to FIG. 14A, mechanisms 510 and 513 are operable to pivot their associated axle in the direction of vehicle turning during reverse cornering.

As previously mentioned, the three mechanisms 511–513 appearing above second reservoir 548 are positioned to assist steering during a left-hand turn of the forwardly traveling vehicle, the operation of which are the same as mechanisms 508-511. Thus, during a left-hand turn of the forwardly traveling vehicle, arm 542 moves lever 540' in a direction to deliver fluid under pressure through line 544 which branches into three lines 582, 583 and 601 which lead to the first chamber of the first mechanism 511 in the "left-hand turn" series, to a two line, alternating position solenoid valve 590, and the second chamber of the last mechanism 510 in the "right-hand turn" series, respectively. The solenoid valve 590 is normally closed as to line 583, and normally open as to a bleeder line 616 which connects to both mechanisms 612 and 614 at a first end thereof, and to main return line 556 at a second end thereof whereby the fluid under pressure to mechanisms 612 and 614 is relieved to main return line 556 upon steering the vehicle back to the left and right, respectively.

The first chamber of first mechanism 511 is equipped with a three-way valve 578' to which line 582 connects to deliver fluid under pressure to first chamber 564 thereof via line 544 upon turning the steering to the left, with air being bled to second reservoir 548 via line 595. The second chamber of first mechanism 511 connects to the first chamber of the second mechanism in the series 512 via line 584, and the second chamber of the second mechanism 512 connects to the first chamber of the third mechanism 513 via line 586, with each of the lines 595, 584 and 586 connecting to respective bleeder lines having bleeder valves 578, which in turn connect to a common bleeder line 590 which itself connects directly to second reservoir 548. The initial priming and subsequent operation of mechanisms 511–513 during left-hand turning of the steering in the forwardly travelling direction is the same as the initial priming and subsequent operation of mechanisms 508–510 during right-hand turning of the steering in the forwardly travelling direction, and discussion will therefore now be directed to operation thereof during reverse driving only.

More particularly, when the vehicle 500 if shifted into reverse, reverse switch 104 is automatically engaged (in the same manner as switch 104 in FIG. 6A), which energizes solenoids 590 and 597. As such, normally closed solenoid 597 is opened to allow fluid to travel through line 573 to mechanism 612, and to open solenoid 590 as to line 583 and to close it with respect to line 616. As such, fluid is allowed to travel through line 583 to mechanism 614 while fluid is prevented from travelling through line 616 during reverse travel.

Simply stated, upon activation of reverse switch 104, mechanisms 612 and 614 are actuated which move associated mechanisms 510 and 513 into a position where they will act on the preselected suspension parts of their associated center axle. This arrangement is necessary due to the need for synchronization, and thus hydraulic interconnection, between each of the mechanisms 508–513, and the need for operation of the center axle mechanisms 510 and 513 only during reverse travel.

FIGS. 16A–C illustrate the positioning of the mechanisms 508, 509, 511 and 512 with respect to the steering linkages of their respective axle. Particularly, as seen in FIGS. 16B and C, steering axles 501, 502,505 and 506 are connected to tires 602 and 604 via conventional king pin and steering linkages 606 and 608, respectively, including a conventional tie rod 610 extending between the rear-most pair of steering linkages 608. The terminal ends of the working rods 560 of each ram 508, 509, 511 and 512 are connected to the front-most pair of steering linkages 608 in the same position as conventional steering rams are positioned to exert a force against the respective linkage in a direction towards the respective tire which assists the king pin in steering the tire in a direction away from the ram. Thus, actuation of rams 508 and 509 assist the steering of wheel 602 to the right and actuation of rams 511 and 512 assist the steering of wheel 604 to the left.

The arrangement of the rams may be either lateral or longitudinal with respect to the vehicle body as seen in FIGS. 16B and C, respectively, depending on the existing steering linkage arrangement on the vehicle. Also, the rams themselves are mounted to the vehicle's frame via fin member 628 which attaches to the end of the ram cylinder 508, 509, 511 and 512 opposite rod 560 (FIG. 16A).

Referring lastly to FIGS. 17A–F, a uniquely configured leaf-spring assembly is shown which incorporates a safety feature should the vehicle break an axle or torsion rod. This spring system may be used in combination with the present self-tracking system, but is also useful for any present-day vehicles whether or not they incorporate a self-tracking system. More particularly, the system of FIGS. 17A–F substantially prevents longitudinal sliding of the springs which are mounted to a frame with spring hangers, thereby keeping the associated axle substantially straight should it or its torsion rod break. Conventional springs 700 are seen in FIGS. 17C–F which have flat ends 702 which are supported by the pin of the spring hanger 704. The conventional springs 700 may be limited in movement in the longitudinal direction by providing a stop plate 706 at the end of the hanger 704 which is shown in a modified hanger 708 spaced above the conventional hangers 704. Alternatively, the springs themselves can be modified as seen in FIGS. 17A and B to include a curved, close-looped end 710 wherethrough the pin 712 of the hanger 704 is passed, thereby securing the spring end to its associated spring hanger.

The invention has been described with particular reference to preferred embodiments thereof. It is understood that one skilled in the art may make various modifications thereto which are within the spirit and scope of the invention as defined by the claims which follow.

What is claimed is:

1. Apparatus for making the rear axles of a motor-driven vehicle self-tracking, the motor vehicle having a frame, a steering system, a rear axle suspension system for each of at least one rear axle on the vehicle, and a drive shaft defining a longitudinal center-line of the vehicle, said apparatus comprising:

a) motion sensor means for automatically sensing and distinguishing between a right and left hand turn of the vehicle's steering system;

b) a plurality of axle-pivoting mechanisms positioned adjacent preselected components of said rear axle suspension system; and c) means for operably connecting said motion sensor means to said plurality of axle-pivoting mechanisms, said motion sensor means being operable through said connecting means to activate a first group of said axle-pivoting mechanisms to move their respective rear axle suspension system and respective rear axle in a first pivotal direction with respect to said center-line in response to said motion sensor means sensing a right-hand turn of the vehicle, and said motion sensor means being operable through said connecting means to activate a second group of said axle-pivoting mechanisms to move their respective rear axle suspension system and respective rear axle in a second pivotal direction opposite to said first pivotal direction in response to said motion sensor means sensing a left-hand turn of the vehicle.

2. The apparatus of claim 1 wherein said motion sensor means is mounted on said vehicle adjacent a preselected component of said steering system which exhibits reciprocating movement in response to said steering system being turned to the right and left.

3. The apparatus of claim 1 wherein said first group of said axle-pivoting mechanisms are positioned on the same side of each said preselected component of said rear suspension system with respect to said longitudinal center-line, and said second group of axle-pivoting mechanisms are positioned on the opposite sides of each said preselected component of said rear suspension system.

4. The apparatus of claim 3 wherein said vehicle includes a leaf-spring type rear suspension system and said preselected components are the rear ends of said leaf springs.

5. The apparatus of claim 1 and further comprising means for automatically detecting when said vehicle has been shifted into reverse mode of travel.

6. The apparatus of claim 5 wherein said reverse detecting means is connected to said motion sensor means and said connecting means, said reverse detecting means being operable to activate the opposite of said first and second groups of said axle-pivoting mechanisms when said vehicle is shifted into reverse travelling mode than when said vehicle is shifted into forward travelling mode.

7. The apparatus of claim 6 wherein said vehicle includes first, second and third rear axles, and wherein first and second groups of axle-pivoting mechanisms are positioned adjacent the rear suspension of each of said first, second and third rear axles, and wherein said apparatus further comprises means for activating the opposite ones of said first and second groups of axle-pivoting mechanisms with respect to said third axle than said first and second groups of axle-pivoting mechanisms with respect to said first axle when said vehicle is in said reverse mode of travel.

8. The apparatus according to claim 7 wherein said apparatus is pneumatically operated and said opposite activating means comprises a cross-over solenoid valve connected to and actuable by said reverse detecting means.

9. The apparatus of claim 7 wherein said second axle lies between said first and third axles, and said reverse detecting means is operable to simultaneously activate said first and second groups of axle-pivoting mechanisms on said second axle when said vehicle is in said reverse mode of travel to maintain said second axle substantially perpendicular to said longitudinal center-line.

10. The apparatus of claim 9 wherein said first rear axle lies closer to the front of the vehicle than said second or third rear axles and said first and second groups of axle-pivoting mechanisms are positioned to pivot said first axle in the same direction as said steering system is turned when in said reverse mode of travel.

11. The apparatus of claim 7 and further comprising first, second and third pairs of torsion rods each having front and rear ends with one of said front and rear ends mounted to said first, second and third rear axles, respectively, and the other of said front and rear ends mounted to the vehicle frame, said front ends of each pair of said torsion rods being positioned closer together than said rear ends thereof.

12. The apparatus of claim 11 wherein said axle-pivoting mechanisms positioned adjacent the suspension system of said second and third rear axles engage their respective rear suspension components only when said vehicle is shifted in the reverse mode of travel.

13. The apparatus of claim 1 wherein said axle-pivoting mechanisms are pneumatically operated.

14. The apparatus of claim 13 wherein said motion sensor means is a two-way proportioning valve having a lever pivotally attached thereto and movable by a preselected, reciprocal component of said steering system.

15. The apparatus of claim 14 wherein said steering system includes a pitman arm and said proportioning valve lever is attached to the pitman arm.

16. The apparatus of claim 13 wherein said axle-pivoting mechanisms are of the cylinder and piston type, and further comprising a push plate affixed to the end of the piston extending outwardly of the cylinder body.

17. The apparatus of claim 16 wherein the push plate of each axle-pivoting mechanism is positioned to apply a force against the preselected suspension component upon extension of its respective piston.

18. The apparatus of claim 13 wherein said axle-pivoting mechanisms comprise a bellows having first and second rigid plate members interconnected by a flexible, air-tight web of material, said first and second plates being movable between an actuated position wherein said web is stretched substantially taut by compressed air entering said mechanism, and a de-actuated position wherein the air is vented from said mechanism and said web collapses upon itself and said plates move toward one another.

19. The apparatus of claim 18 wherein said mechanisms each further include a limit plate positioned between said first and second plates.

20. The apparatus of claim 1 wherein said axle-pivoting mechanisms are operable to vary the amount of force applied against a respective rear suspension system component.

21. The apparatus of claim 20 wherein said motion sensor means is operable to actuate said axle-pivoting mechanisms to a degree directly proportional to the degree to which the vehicle's steering system is turned.

22. The apparatus of claim 1 wherein said axle-pivoting mechanisms are biased in a retracted position removing any force being applied to a respective suspension component by the axle-pivoting mechanism upon said motion-sensor means detecting neither a right or left turn of the vehicle's steering system.

23. The apparatus of claim 1 wherein said motion sensor means is a potentiometer having a rotor, said mechanisms being pneumatically operated, and wherein said connecting means include a stepper motor and proportioning valve connected to each of said mechanisms, and further comprising electric control means actuating selected groups of said stepper motors depending on whether said potentiometer rotor is rotated to the right or left by said steering system, whereby actuation of a stepper motor opens its respective proportioning valve to allow air under pressure to actuate its respective mechanism.

24. The apparatus of claim 1 wherein said preselected suspension components are air-bags on the vehicle, and further comprising a rigid wall member disposed between laterally adjacent sets of air-bags on a rear axle of the vehicle, said axle-pivoting mechanisms being positioned between said wall member and said air-bags.

25. The apparatus of claim 24 wherein said air-bags each include a bottom support wall and said mechanisms are positioned to bear against the bottom support wall of a respective air-bag.

26. The apparatus of claim 25 and further comprising a torsion rod connecting said air-bag bottom support wall to said respective axle, and a rotatable bearing disposed between said torsion rod and said respective axle.

27. The apparatus according to claim 1 wherein said motion detector means is ultrasonically operated.

28. The apparatus of claim 1 wherein said motion detector means is magnetically operated.

29. The apparatus of claim 28 wherein said vehicle is a tractor-trailer and said motion detector means is positioned adjacent the fifth wheel of the tractor.

30. The apparatus of claim 1 wherein said axle-pivoting mechanisms are hydraulically operated.

31. The apparatus of claim 30 wherein said axle-pivoting mechanisms each comprise a piston having a cylinder, piston plate and piston rod, and each piston further having dual inlet/outlet ports communicating with first and second discrete fluid chambers within said cylinder defined by said piston plate, and wherein said first and second groups of axle pivoting mechanisms on one rear axle are hydraulically interconnected through one of said inlet/outlet ports to one of said inlet/outlet ports on said first and second groups of axle-pivoting mechanisms on a longitudinally adjacent rear axle, respectively, whereby actuation of the first axle-pivoting mechanism in a hydraulically-coupled series causes a substantially simultaneous chain-reaction amongst each axle-pivoting mechanism in said series.

32. A method for making the rear axles of a motordriven vehicle self-tracking, the vehicle having a frame, a steering system, a rear axle suspension system for each of at least one rear axle on the vehicle, and a drive shaft defining a longitudinal center-line of the vehicle, said method comprising the steps of:

a) providing a means for automatically sensing and distinguishing between a right and left hand turn of the vehicle's steering system;

b) applying a force in a first direction against preselected components of said vehicle's rear axle suspension system in response to detecting a right hand turn of said vehicle's steering system; and c) applying a force in a second direction against said preselected suspension system components opposite said first direction in response to detecting a left hand turn of said vehicle's steering system;

d) providing a means for detecting when said vehicle is in the reverse mode of travel; and e) reversing said first and second directions upon detecting a reverse mode of travel.

* * * * *